(12) United States Patent
Inoue et al.

(10) Patent No.: US 8,145,753 B2
(45) Date of Patent: Mar. 27, 2012

(54) OPERATION SUPPORTING DEVICE AND METHOD FOR SUPPORTING OPERATION

(75) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 185 days.

(21) Appl. No.: 12/671,535

(22) PCT Filed: Feb. 24, 2009

(86) PCT No.: PCT/JP2009/000777
§ 371 (c)(1),
(2), (4) Date: Feb. 1, 2010

(87) PCT Pub. No.: WO2009/107356
PCT Pub. Date: Sep. 3, 2009

(65) Prior Publication Data
US 2010/0287275 A1    Nov. 11, 2010

(30) Foreign Application Priority Data
Feb. 26, 2008  (JP) .................................. 2008-045114

(51) Int. Cl.
*G06F 15/173* (2006.01)
(52) U.S. Cl. ......... 709/224; 709/223; 709/202; 709/203
(58) Field of Classification Search .................. 709/224, 709/202, 203, 223; 714/39, 25, 37, 47.1–47.3; 715/705–715
See application file for complete search history.

(56) References Cited

U.S. PATENT DOCUMENTS

| 7,478,072 B2 * | 1/2009 | Kato ................................. 706/11 |
| 7,571,248 B2 * | 8/2009 | Kutsumi et al. ............... 709/238 |
| 7,627,664 B2 * | 12/2009 | Sutou et al. .................... 709/224 |
| 7,936,356 B2 * | 5/2011 | Furuichi et al. ................ 345/522 |
| 2001/0039481 A1 * | 11/2001 | Tremblay et al. ............... 702/35 |
| 2007/0092857 A1 * | 4/2007 | Ito .................................. 434/118 |
| 2007/0118638 A1 * | 5/2007 | Ban et al. ....................... 709/224 |

FOREIGN PATENT DOCUMENTS

| JP | 10-222467 | 8/1998 |
| JP | 2004-310755 | 11/2004 |
| JP | 2007-316803 | 12/2007 |
| WO | 2007-116689 | 10/2007 |
| WO | 2007-148477 | 12/2007 |

OTHER PUBLICATIONS

International Search Report issued Apr. 21, 2009 in International (PCT) Application No. PCT/JP2009/000777.

* cited by examiner

*Primary Examiner* — Wing Chan
*Assistant Examiner* — Ruolei Zong
(74) *Attorney, Agent, or Firm* — Wenderoth, Lind & Ponack, L.L.P.

(57) ABSTRACT

Provided is an operation supporting device estimating an apparatus to be supported in operation and support the operation independent of a position relationship between a position of the apparatus to be supported and a position of the user. The operation supporting device includes: an operation history collecting unit collecting operation histories from the apparatuses, during a time period preceding a predetermined time period from a time when the user requests support; a to-be-supported apparatus estimating unit determining, for each of the apparatuses, a degree of matching between an operation history collected by the operation history collecting unit and a confused operation, and estimating that an apparatus, which is determined to have the degree of matching that exceeds a predetermined threshold, is an apparatus having a higher requirement for support; and a function description output unit outputting a description of the functions of the apparatus estimated to have the higher requirement.

13 Claims, 20 Drawing Sheets

FIG. 3

| Operation-support requested time:19:55 | Time period for obtaining operation histories: 5 minutes | | | | | |
|---|---|---|---|---|---|---|
| Apparatus ID | Status preceding by Δt | Operation number | Operation time | Interval [s] | Selection item/ button | Executed function |
| 0001_T (Television 1) | Broadcast video output (8ch) | 1 | 19:53:28 | | Input switch | Input switch |
| | | 2 | 19:53:29 | 1 | Input switch | Input switch |
| | | 3 | 19:53:30 | 1 | Input switch | Input switch |
| | | ... | ... | | | |
| 0003_R (Recorder) | Menu displayed | 1 | 19:51:11 | | Menu | |
| | | 2 | 19:51:21 | 10 | Other functions | |
| | | 3 | 19:51:22 | 1 | Setting | |
| | | 4 | 19:51:23 | 1 | Return | |
| | | 5 | 19:52:00 | 27 | Other functions | |
| | | ... | ... | | | |
| 0004_A (Air conditioner) | Turned off | 1 | 19:52:40 | | Turned on | Cooling (28°C) |
| | | 2 | 19:52:41 | 1 | Low | Cooling (27°C) |
| | | 3 | 19:52:42 | 1 | Low | Cooling (26°C) |

FIG. 4

| Apparatus ID | Executed function | Day of week | Function start time period | | | | | |
|---|---|---|---|---|---|---|---|---|
| | | | 0 to 2 o'clock | 2 to 4 o'clock | ... | 19 to 20 o'clock | 20 to 21 o'clock | ... |
| 0005_W (Laundry machine) | Laundry (normal mode) | Monday | 0 | 0 | ... | 6 | 2 | ... |
| | | Tuesday | 0 | 0 | ... | 2 | 1 | ... |
| | | Wednesday | 0 | 0 | ... | 3 | 0 | ... |
| | | ... | ... | ... | ... | ... | ... | ... |
| | Laundry (quick mode) | Monday | 0 | 0 | ... | 52 | 38 | ... |
| | | Tuesday | 0 | 0 | ... | 48 | 32 | ... |
| | | Wednesday | | | | | | |

FIG. 5

| Apparatus ID | Function number | Function name | Function description |
|---|---|---|---|
| 0003_R (Recorder) | 1 | Schedule recording by specifying recording time | Method for scheduling by manually setting scheduled date, scheduled channel, start time, etc. |
| | 2 | Schedule recording by searching program guide | Schedule recording by searching broadcast program desired to be recorded, using "genre" and "keyword" |
| | 3 | Dub combination of broadcast programs | Broadcast programs (titles) in "Video DR" list can be dubbed only onto DVD-RAM or DVD-R (VR system) |
| | 4 | Edit title of broadcast program | 1. Press "playback navi" during playback or stop<br>2. Press "red" or "blue" button and "Video" ... |
| | 5 | Adjust time | This device obtains information sent through digital broadcasting, and automatically adjusts time, so normally ... |

FIG. 6

| Apparatus ID | Function count | Available IF | Collected-time-period use IF | Collected-time-period use operating device | Button count/hierarchy level count | Single-function button count | Executable function rate |
|---|---|---|---|---|---|---|---|
| 0001_T (Television 1) | 50 | Menu type / Button type | Menu type | — | 2 | — | 90% |
| 0002_T (Television 2) | 50 | Menu type / Button type | — | — | — | — | — |
| 0003_R (Recorder) | 200 | Menu type / Button type | Menu type | — | 4 | — | 95% |
| 0004_A (Air conditioner) | 30 | Button type | Button type | Remote control | 9 | 5 | 100% |
| 0005_W (Laundry machine) | 50 | Button type | Button type | Main body | 15 | 7 | 100% |
| 0006_S (Stereo) | 100 | Button type | Button type | Main body | 17 | 10 | 50% |
| 0007_TF (Fixed-line phone/fax) | 60 | Button type | — | (Main body) | 8 | 4 | 100% |

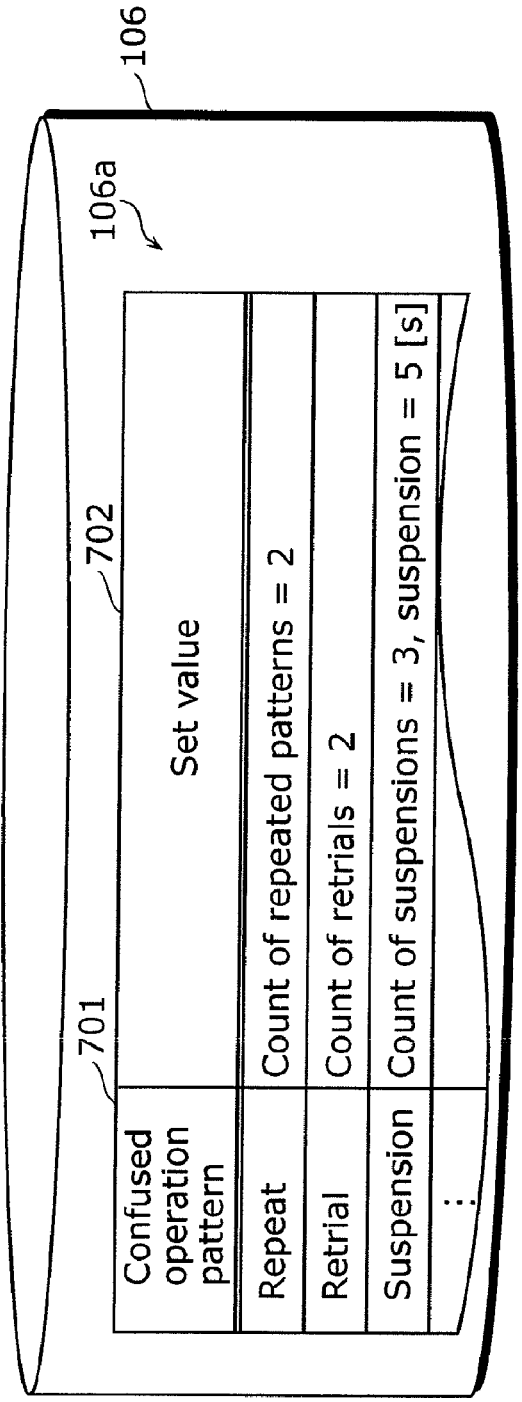

FIG. 8

| Apparatus ID | Confused operation pattern | Set value |
|---|---|---|
| 0003_R (Recorder) | "List to be reproduced" → sub-menu | Count of repeated patterns = 2 |
| | "Program guide" → "up" "down" "left" "right" | "Up" "down" "left" "right" = 20 times in total |
| | Open cover of remote control | Count of repeated patterns = 2 |

FIG. 9

| Apparatus ID | Operation pattern | Target function | Target probability |
|---|---|---|---|
| 0003_R (Recorder) | "List to be reproduced" → sub-menu | Dubbing | 68.5% |
| | "Program guide" → "up" "down" "left" "right" | Searching broadcast program using names of people | 46.5% |
| | "Program guide" → "up" "down" "left" "right" | Searching broadcast program using genre | 40.5% |
| | "Other functions" → "setting" | Changing output audio | 46.5% |
| | ... | ... | ... |

FIG. 10

| Apparatus ID | Confused level | Within-level rank | Aggregate rank | Possibility of others |
|---|---|---|---|---|
| 0001_T (Television 1) | Level 4 | 4 | 4 | Present |
| 0002_T (Television 2) | Level 3 | 1 | 5 | — |
| 0003_R (Recorder) | Level 4 | 1 | 1 | — |
| 0004_A (Air conditioner) | Level 1 | 2 | 7 | — |
| 0005_W (Laundry machine) | Level 4 | 3 | 2 | — |
| 0006_S (Stereo) | Level 4 | 2 | 3 | — |
| 0007_TF (Fixed-line phone/fax) | Level 1 | 1 | 6 | — |

FIG. 11

| Apparatus ID | Confused level | Estimated rank | Estimated function | Estimated score |
|---|---|---|---|---|
| 0003_R (Recorder) | Level 1 | 1 | Scheduled recording using EPG | 68.5 |
| | | 2 | Scheduled recording by specifying recording time | 62.0 |
| | | 3 | Immediate recording | 50.5 |
| | | 4 | Searching broadcast program using names of people | 37.0 |
| | | 5 | Searching broadcast program using genre | 36.5 |
| | | 6 | Searching broadcast program using keyword | 36.5 |
| | | 7 | | |

FIG. 12

| Apparatus ID | Operating date | Function-executed time period | Operating day of week | Executed function name |
|---|---|---|---|---|
| 0005_W (Laundry machine) | 2007/5/23 | 20:30−21:10 | Wednesday | Laundry (quick mode) |
| | 2007/5/22 | 20:50−21:30 | Tuesday | Laundry (quick mode) |
| | 2007/5/21 | 20:10−20:40 | Tuesday | Dry (30 minutes) |
| | 2007/5/20 | 20:45−21:25 | Monday | Laundry (quick mode) |
| | 2007/5/19 | 19:30−20:20 | Sunday | Laundry (normal mode) |
| | 2007/5/18 | 19:30−20:20 | Saturday | Laundry (normal mode) |

OPERATION SUPPORTING DEVICE AND METHOD FOR SUPPORTING OPERATION

TECHNICAL FIELD

The present invention relates to, for example, an operation supporting device and a method for supporting an operation, for providing a user with information on an operation for executing a function desired by the user from among functions of apparatuses.

BACKGROUND ART

Along with the implementation of various functions and services, methods for operating apparatuses of recent years become complicated. Thus, providing operation support to the user who is confused about the operation methods is of increasing importance. Under such circumstances, apparatuses have functions for browsing electronic manuals or operation supporting functions, such as help functions, have emerged. However, since such apparatuses having the operation supporting functions support operations basically through respective screens, the apparatuses are limited to apparatuses each having a screen, such as televisions, video recording apparatuses, and cellular phones. For example, when the user is confused about a method for operating an apparatus having no screen, such as a stereo, a fixed-line phone, and a refrigerator, the user still needs to take more troubles, as opening a manual printed on a paper document and looking for a necessary page in the manual.

Thus, conventionally, a dedicated terminal capable of displaying a description of how to operate an apparatus including an apparatus having no screen has been suggested (see Patent Reference 1). The dedicated terminal disclosed in Patent Reference 1 can identify an apparatus by reading information of a wireless tag attached to each apparatus, and display, for example, an electronic manual of the identified apparatus to the user.

Patent Reference 1: Japanese Unexamined Patent Application Publication No. 2004-310755

DISCLOSURE OF INVENTION

Problems that Invention is to Solve

However, according to the method disclosed in Patent Reference 1, the user needs to identify an apparatus by bringing the dedicated terminal closer to the wireless tag attached to the apparatus. For example, when the user operates a television using a remote control and is confused about the operation method, the user needs to identify the television by bringing the dedicated terminal closer to the television, according to the method disclosed in Patent Reference 1. Furthermore, there are cases where apparatuses including a video recording apparatus, audio equipment, and mobile audio equipment aside from a television are present together in a place where the television is placed, such as in a living room. Under such a circumstance where the apparatuses are closer to each other, when a dedicated terminal reads information of a wireless tag using short radio waves, such as Bluetooth (trademark) to identify an apparatus, the dedicated terminal detects the apparatuses that are closer to the apparatus to be identified. As a result, the user needs to reselect the apparatus for which the user needs the description of how to operate the apparatus, from among the detected apparatuses. Furthermore, according to the method disclosed in Patent Reference 1, the dedicated terminal enables only display of a manual of the apparatus identified by the dedicated terminal by bringing the dedicated terminal closer thereto. Thus, the user needs to take more troubles for searching the manual for a function which the user desires to know.

The present invention has an object to solve the problems, and provides, for example, an operation supporting device and a method for supporting an operation, for estimating an apparatus to be supported in operation and supporting the operation independent of a position relationship between a position of the apparatus to be supported and a position of the user, and of a density of apparatuses.

Means to Solve the Problems

In order to solve the problems, the operation supporting device according to an aspect of the present invention is an operation supporting device that provides a user with information on an operation for executing a function desired by the user from among functions of each of apparatuses connected to a network, and the operation supporting device includes: an operation history collecting unit configured to collect, from the apparatuses, operation history information including operation histories that are time-series information of operations that have been performed by the user during a time period preceding by a predetermined time period from a time when the user requests support; an apparatus information storage unit configured to store function description information including descriptions on the functions of each of the apparatuses; a confusion definition information storage unit configured to store confusion definition information that defines operations when the user is confused due to an inability to execute the function desired by the user; a to-be-supported apparatus estimating unit configured to determine, for each of the apparatuses with reference to the confusion definition information storage unit, a degree of matching between an operation history included in the operation history information collected by the operation history collecting unit and a confused operation defined in the confusion definition information, and estimate that an apparatus that is determined to have the degree of matching that exceeds a predetermined threshold is an apparatus having a high requirement for support in order for the user to perform the operations; and a function description output unit configured to output at least one of the descriptions on the functions of the apparatus estimated as having the high requirement for the support, with reference to the function description information stored by the apparatus information storage unit.

With the configuration, the operation supporting device can determine whether or not the user is confused based on operation histories of the apparatuses, using a characteristic of the user who performs operations specific to the user in confusion before the user needs the operation support, and estimate an apparatus having a high requirement for the support. Thus, the trouble of identifying an apparatus for which the user desires to be supported in the operation can be reduced.

Furthermore, since the operation supporting device is connected to plural apparatuses via the network, the user at a great distance can be supported in the operation. In other words, the user can be supported in the operation independent of a position relationship between a position of the apparatus and a position of the user, and of a density of the plural apparatuses.

Preferably, the operation history information further includes execution statuses of each of the functions of the apparatuses at the time preceding by the predetermined time period, and the to-be-supported apparatus estimating unit is further configured to determine whether or not a function of one of the apparatuses of which operation histories are not included in the operation history information is being executed at the time when the user requests the support, based on the execution statuses of the functions included in the operation history information, and to estimate that the one of the apparatuses is an apparatus having a higher requirement for the support when the function is determined as not being executed.

The configuration enables estimation of an apparatus having a high requirement for support in operation, even when there is no operation history of the user during a predetermined time period.

Preferably, the to-be-supported apparatus estimating unit is further configured to specify a time when the user last operated each of apparatuses that are estimated as having the high requirement for the support, with reference to the operation history information, and estimate that, from among the apparatuses, an apparatus corresponding to a shorter time period from the specified time to the time when the user requests the support is an apparatus having a higher requirement for the support.

The configuration can further prioritize apparatuses estimated as having a high requirement for support. Thus, an apparatus having a higher priority, in other words, an apparatus that is highly likely to have a high requirement for support can be supported as a priority.

Preferably, the operation supporting device further includes: a function-estimating definition information storage unit configured to store function-estimating definition information that defines associations between the time-series information of the operations that have been performed by the user and a target function; a to-be-supported function estimating unit configured to estimate a function that the user desires to execute and that is included in a corresponding one of the apparatuses estimated as having the high requirement for the support, based on the operation history information and the function-estimating definition information; and a supporting method determining unit configured to determine a supporting method based on the function estimated by the to-be-supported function estimating unit, wherein the function description output unit is configured to output a corresponding one of the descriptions on the functions, according to the supporting method determined by the supporting method determining unit.

Since the function desired by the user can be estimated with the configuration, operation support can be provided more efficiently.

Preferably, the time-series information of the operations that have been performed by the user and the target function are associated with each other in the function-estimating definition information, and the function-estimating definition information further includes a target probability indicating a probability of being the function desired by the user, the to-be-supported function estimating unit is configured to estimate that a target function having a higher target probability is a function having a higher requirement for the support, from among target functions in which the time-series information and the operation histories included in the operation history information match, the time-series information being of the operations that have been performed by the user and being included in the function-estimating definition information, and the supporting method determining unit is configured to determine the supporting method indicating whether the function description output unit outputs each of the descriptions on the functions per apparatus or per function, based on (i) a level of the requirement for the support to operate the function estimated by the to-be-supported function estimating unit and (ii) an amount of information that can be outputted by the function description output unit.

The configuration enables changing a method for displaying operation support information on, for example, a screen of the operation supporting device, in consideration of balance with a level of a probability of being the function desired by the user, display capabilities of the screen, and others. In other words, the user can be more efficiently provided with support information when the user uses an apparatus that is highly likely to have a high requirement for support and a function that is highly likely desired by the user.

Preferably, the to-be-supported apparatus estimating unit is further configured to extract, from among the apparatuses, apparatuses each of which receives an input operation at the time when the user requests the support, with reference to the operation history information, and the function description output unit is configured to output the at least one of the descriptions so that the user can identify the apparatus estimated by the to-be-supported apparatus estimating unit as having the high requirement for the support, from among the apparatuses extracted by the to-be-supported apparatus estimating unit.

The configuration enables the user to receive information on an apparatus estimated as being confused by other users when operating the apparatus.

Preferably, the confusion definition information is information in which an operation pattern of an operation button to be operated by the user who is confused and the predetermined threshold are associated with each other, and the to-be-supported apparatus estimating unit is configured to determine a degree of matching between the operation history included in the operation history information and the operation pattern included in the confusion definition information, and estimate that an apparatus that is determined to have the degree of matching that exceeds the predetermined threshold corresponding to the operation pattern is an apparatus having a higher requirement for the support.

The configuration can increase the precision of estimating an apparatus having a high requirement for support.

Furthermore, the operation supporting method according to an aspect of the present invention is an operation supporting method in which an operation supporting device provides a user with information on an operation for executing a function desired by the user from among functions of each of apparatuses connected to a network, the operation supporting device includes: an apparatus information storage unit configured to store function description information including descriptions on the functions of each of the apparatuses; and a confusion definition information storage unit configured to store confusion definition information that defines operations when the user is confused due to an inability to execute the function desired by the user, the operation supporting method includes: collecting, from the apparatuses, operation history information including operation histories that are time-series information of operations that have been performed by the user during a time period preceding by a predetermined time period from a time when the user requests support, the collecting being performed by the operation supporting device; determining, for each of the apparatuses with reference to the confusion definition information storage unit, a degree of matching between an operation history included in the operation history information collected in the collecting and a confused operation defined in the confusion definition information, and estimating that an apparatus that is determined to have the degree of matching that exceeds a predetermined threshold is an apparatus having a high requirement for support in order for the user to perform the operations, using an operation supporting device, the determining and estimating being performed by the operation supporting device; and outputting at least one of the descriptions on the functions of the apparatus estimated as having the high requirement for the support, with reference to the function description information stored by the apparatus information storage unit, the outputting being performed by the operation supporting device.

The present invention may be implemented as a program causing a computer to execute the steps included in such a method for supporting an operation. Such a program may be distributed through a recording medium, such as a Compact Disc-Read Only Memory (CD-ROM) and via a communication network, such as the Internet.

Effects of the Invention

The operation supporting device according to an aspect of the present invention can estimate an apparatus having a high requirement for support in operation independent of a position relationship between a position of the apparatus to be supported and a position of the user, or of a density of apparatuses, and the trouble of identifying an apparatus for which the user desires to be supported in operation can be reduced.

BRIEF DESCRIPTION OF DRAWINGS

FIG. 3 illustrates an example of operation history information according to the embodiment of the present invention.

FIG. 4 illustrates an example of usage information according to the embodiment of the present invention.

FIG. 5 illustrates an example of function description information according to the embodiment of the present invention.

FIG. 6 illustrates an example of interface information according to the embodiment of the present invention.

FIG. 7A illustrates an example of confusion definition information according to the embodiment of the present invention.

FIG. 7B illustrates specific examples of definitions of confused operation patterns.

FIG. 8 illustrates an example of the confusion definition information when a confused operation pattern is defined for each apparatus.

FIG. 9 illustrates an example of function-estimating definition information according to the embodiment of the present invention.

FIG. 10 illustrates an example of estimated-apparatus result information according to the embodiment of the present invention.

FIG. 11 illustrates an example of estimated-function result information according to the embodiment of the present invention.

FIG. 12 illustrates an example of the operation history information held by an apparatus connected to an operation supporting terminal according to the embodiment of the present invention via a network.

Figure 17:
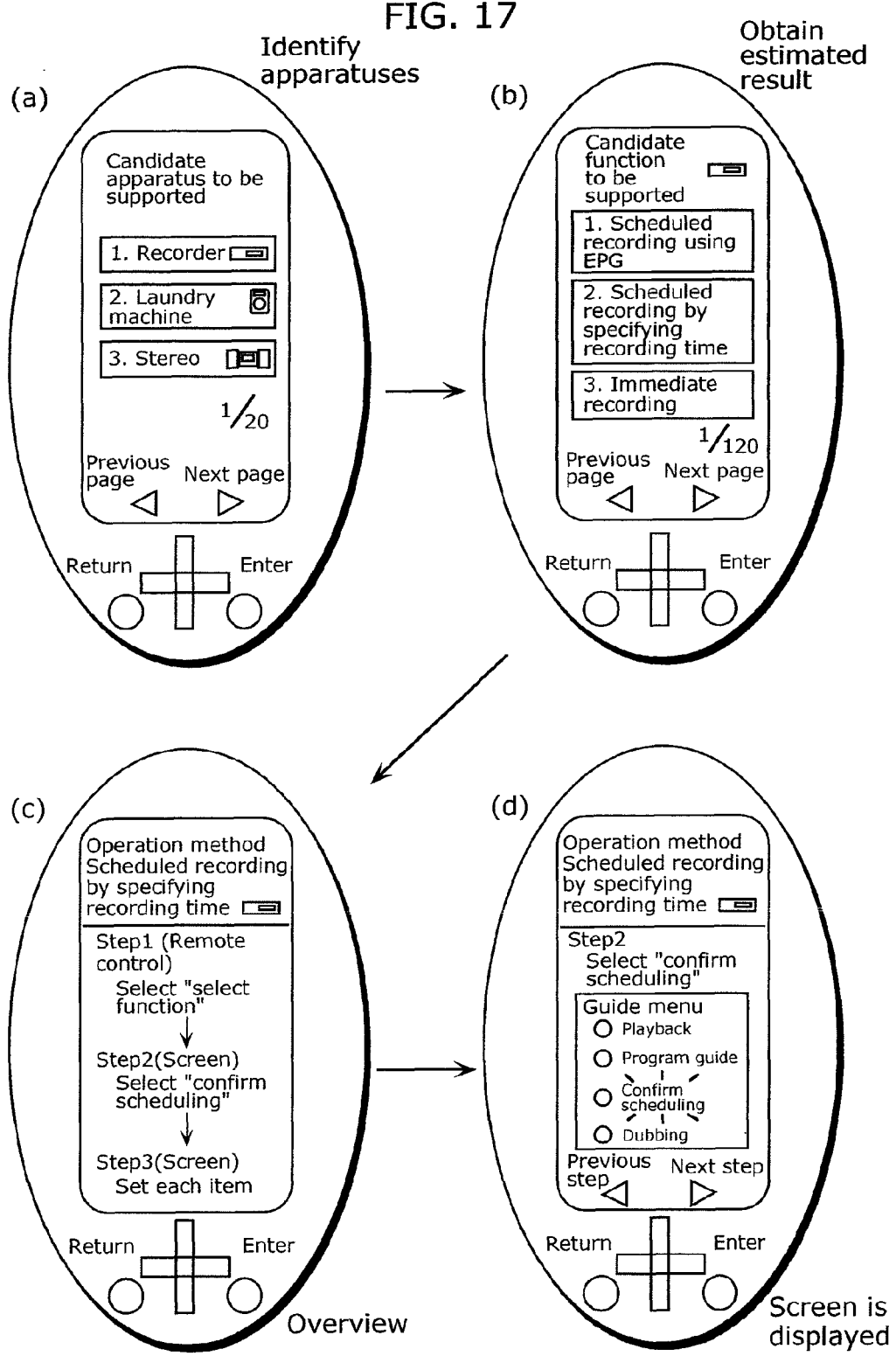

(a), (b), (c), and (d) in FIG. 17 illustrate examples of output screens to which a function description output unit included in the operation supporting terminal according to the embodiment of the present invention outputs descriptions.

Figure 18:
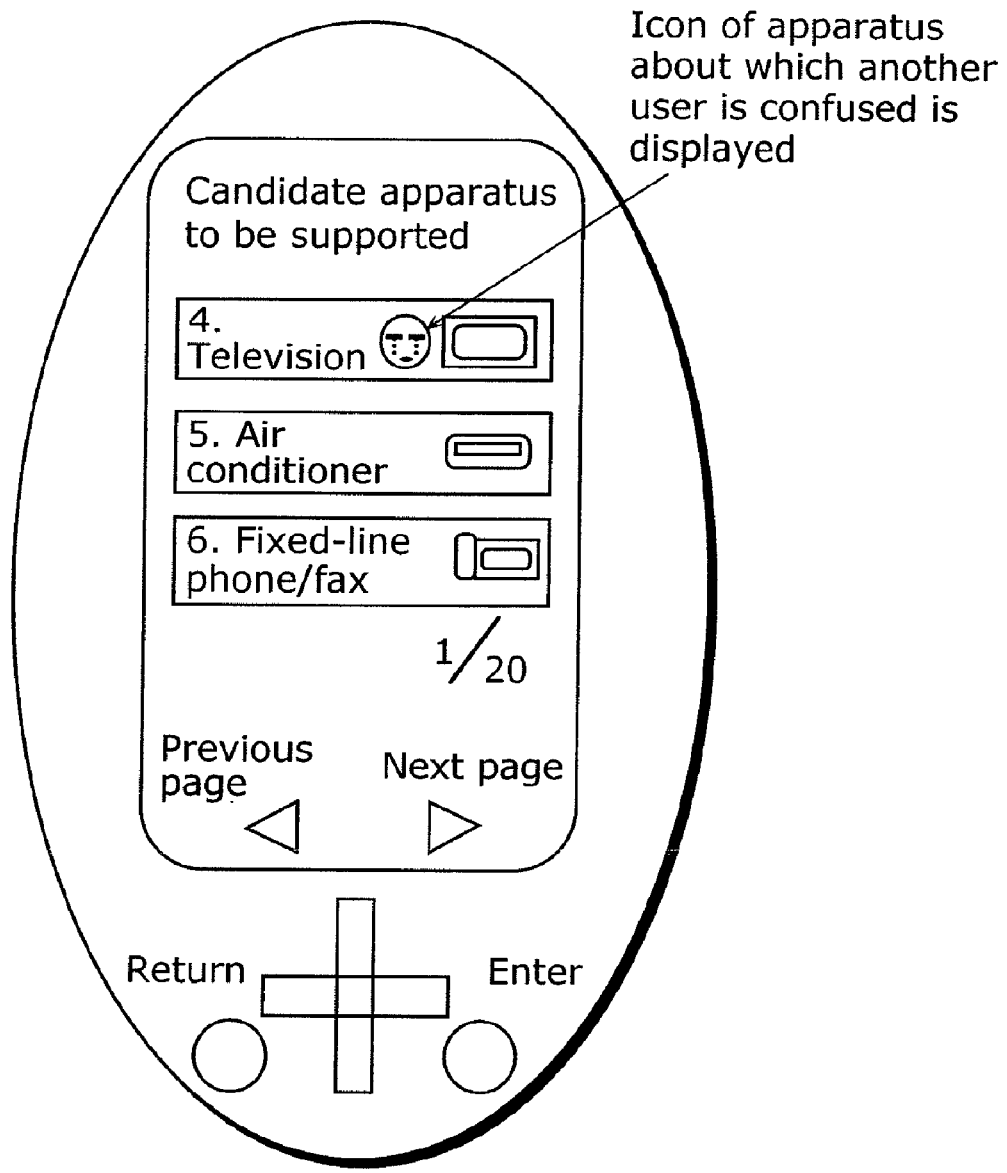

FIG. 18 shows an example of an output screen showing a status in which a user different from the user whose operation has been supported by the operation supporting terminal according to the embodiment of the present invention is confused.

Figure 19:
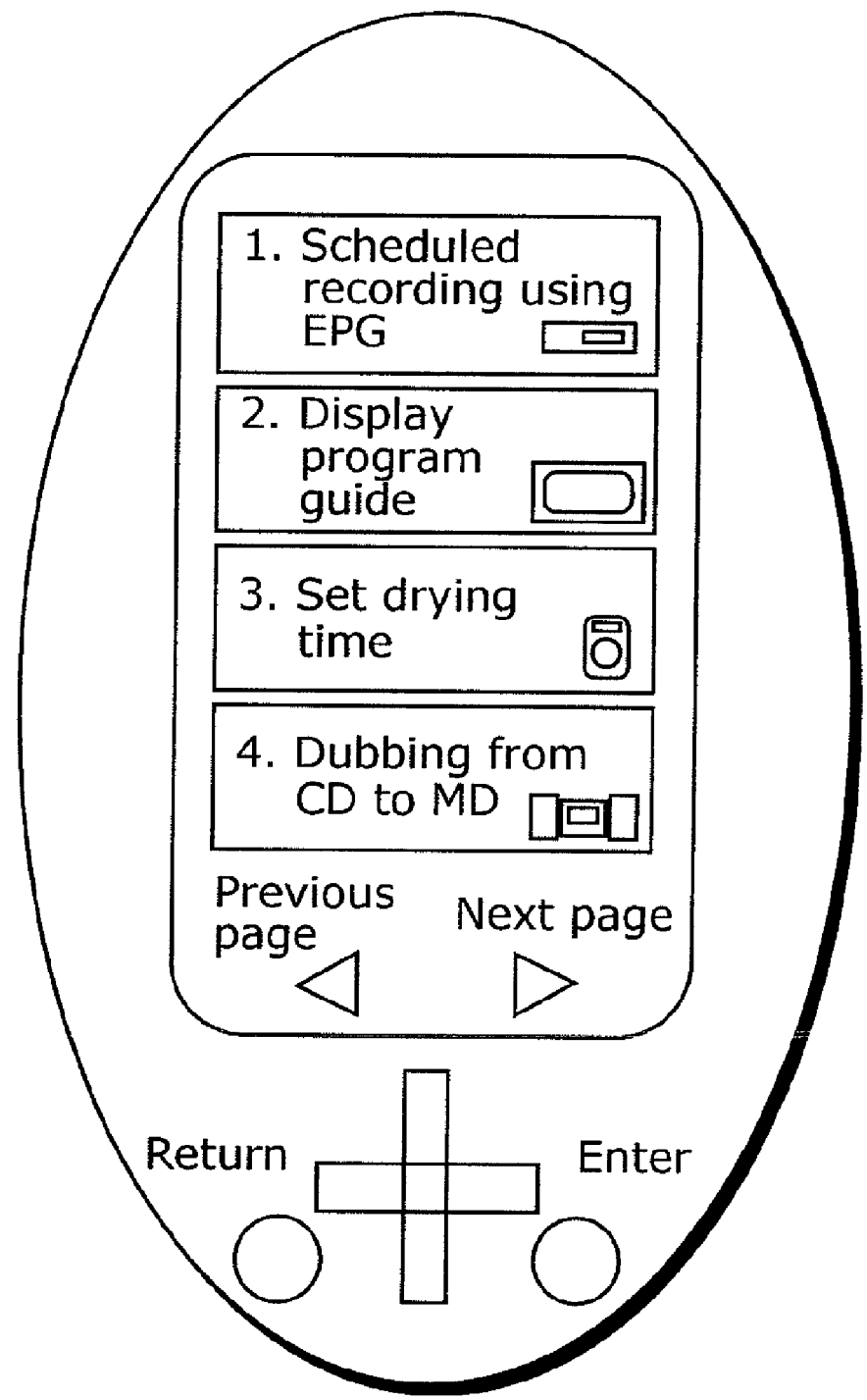

FIG. 19 shows an example of an output screen on which apparatuses and functions estimated by the operation supporting terminal according to the embodiment of the present invention are simultaneously displayed.

Figure 20:
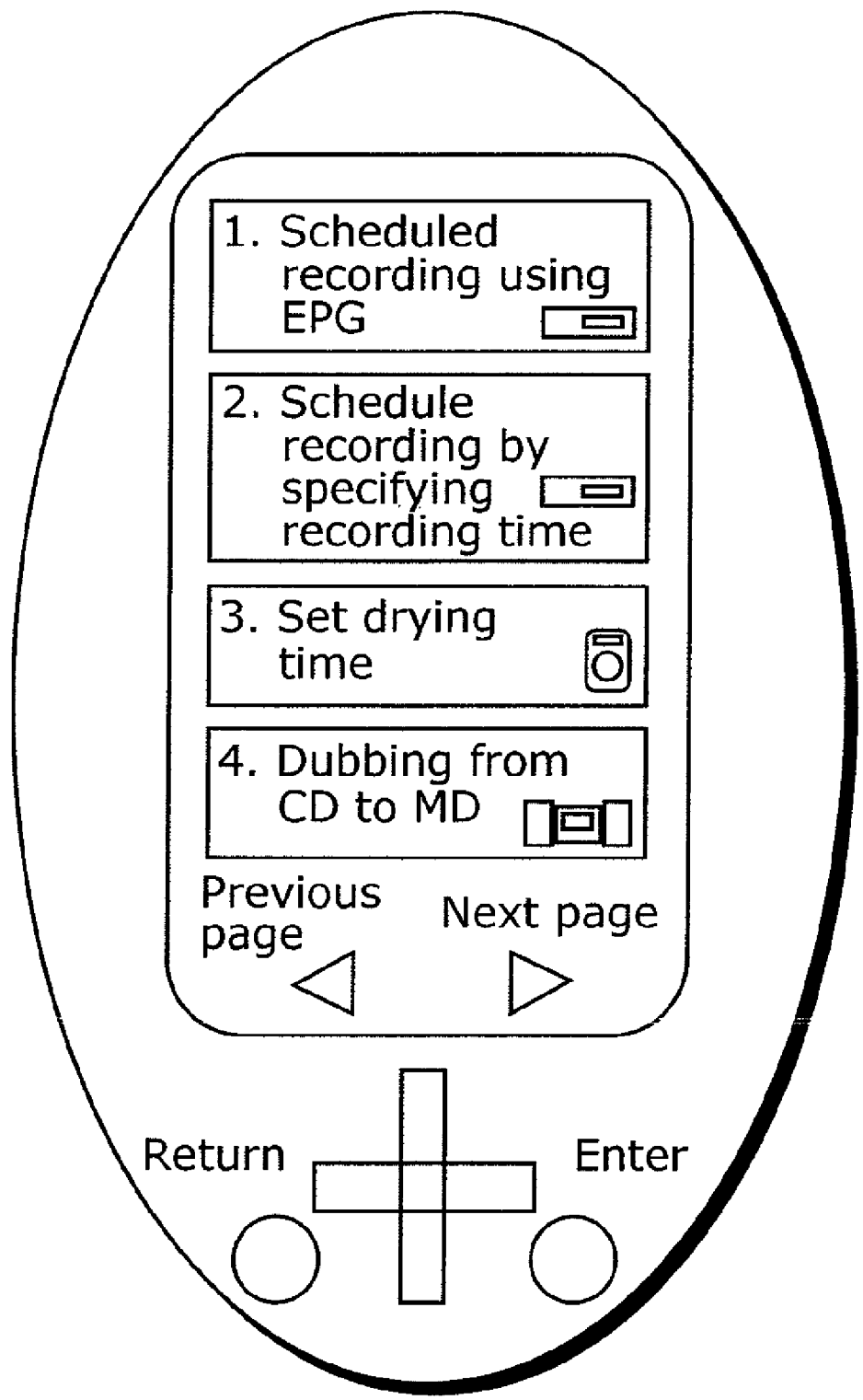

FIG. 20 shows an example of an output screen when the operation supporting terminal according to the embodiment of the present invention controls a method for displaying estimated functions according to a count of items displayable per screen.

NUMERICAL REFERENCES

100 Operation supporting system
101 Operation supporting terminal
102 User-operated input unit
103 Operation history collecting unit
104 Operation history storage unit
104a Operation history information
104b Usage information
105 Apparatus information storage unit
105a Function description information
105b Interface information
106 Confusion definition information storage unit
106a Confusion definition information
107 To-be-supported apparatus estimating unit
108 Function-estimating definition information storage unit
108a Function-estimating definition information
109 To-be-supported function estimating unit
110 Estimated result storage unit
110a Estimated-apparatus result information
110b Estimated-function result information
111 Supporting method determining unit
112 Function description output unit
113 Timer
200 Network
1001 Apparatus
1002 User-operated input unit
1003 Operation history storage unit
1003a Operation history information
1003b Usage information
1004 Apparatus information storage unit
1005 Operation history transmitting unit
1006 Timer
1007 Control unit
2001, 2002 Digital television
3001 DVD/HDD recorder
4001 Laundry machine
5001 Air conditioner
6001 Stereo
7001 Fixed-line phone/fax

BEST MODE FOR CARRYING OUT THE INVENTION

An embodiment of the present invention will be hereinafter described with reference to drawings.

Figure 1:
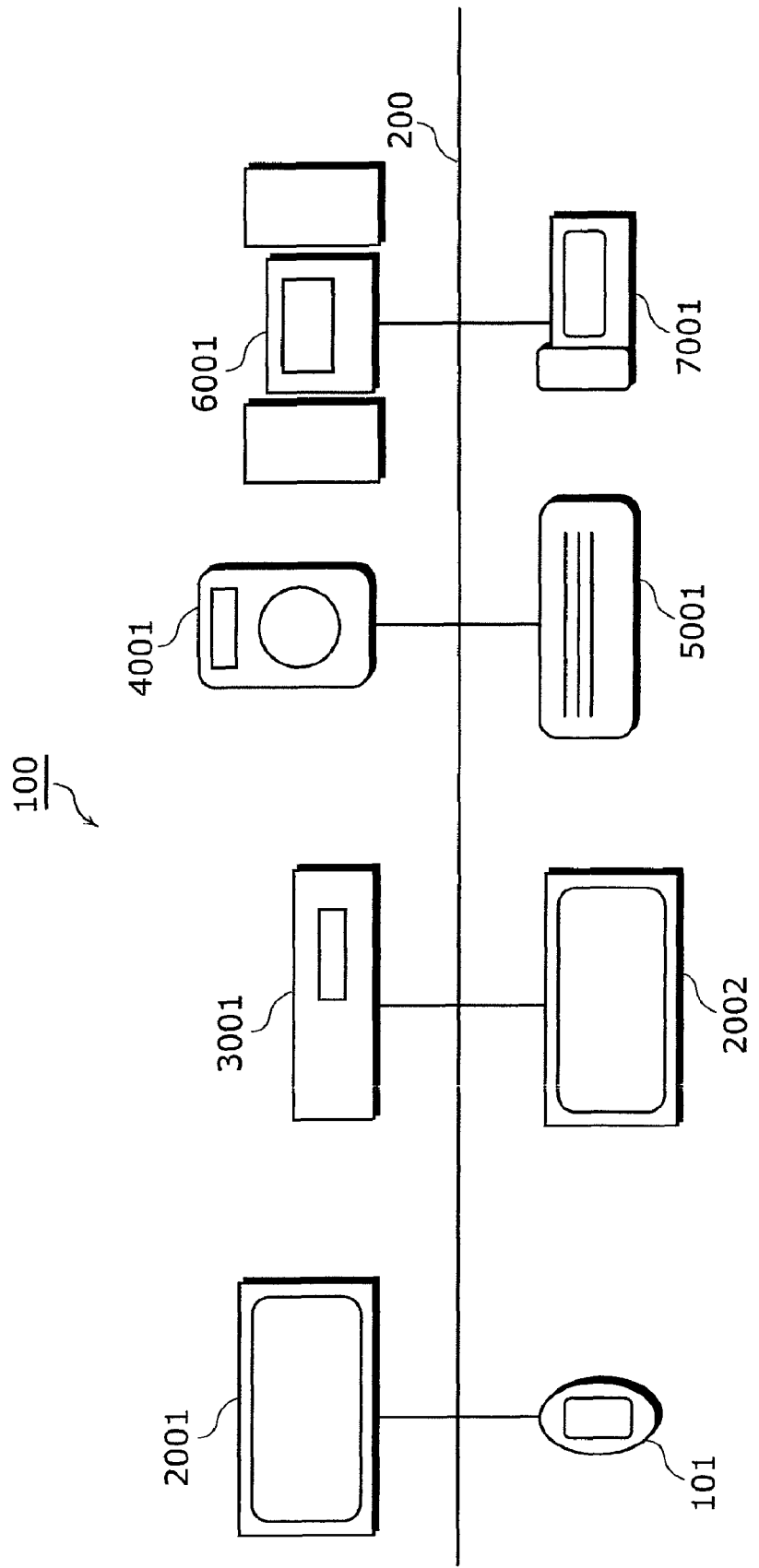
FIG. 1 illustrates an outline view of a configuration of an operation support system according to an embodiment of the present invention.

FIG. 1 illustrates an outline view of a configuration of an operation supporting system 100 according to the embodiment of the present invention. As illustrated in FIG. 1, an operation supporting terminal 101, a digital television 2001, a digital television 2002, a DVD/HDD recorder 3001, a laundry machine 4001, an air conditioner 5001, a stereo 6001, and a fixed-line phone/fax 7001 that are included in the operation supporting system 100 are mutually connected via a network 200.

The operation supporting terminal 101 is an operation supporting apparatus that estimates an apparatus for which the user needs to be supported in operation, from among the apparatuses connected to the network 200, and that supports the user to operate the estimated apparatus. The operation supporting terminal 101 is used separately from an apparatus to be used in order to facilitate supports in operation, such as providing operation procedures and information, when the user uses the apparatus having a small display or no display, such as an air conditioner and a laundry machine.

The digital television 2001, the digital television 2002, the DVD/HDD recorder 3001, the laundry machine 4001, the air conditioner 5001, the stereo 6001, and the fixed-line phone/fax 7001 are examples of apparatuses for which the user needs to be supported in each operation. Each of these apparatuses which do not particularly need to be distinguished from each other will be hereinafter denoted as an apparatus 1001. The apparatus 1001 is an apparatus that represents the apparatuses connected to the network 200.

Apparatuses not illustrated herein, for example, an air purification system and a gaming machine, may be included in the operation supporting system 100.

The network 200 may be of any system as long as each apparatus can communicate with each other. Furthermore, the network 200 may be not only a wired network but also a wireless network, such as a wireless Local Area Network (LAN).

Figure 2:
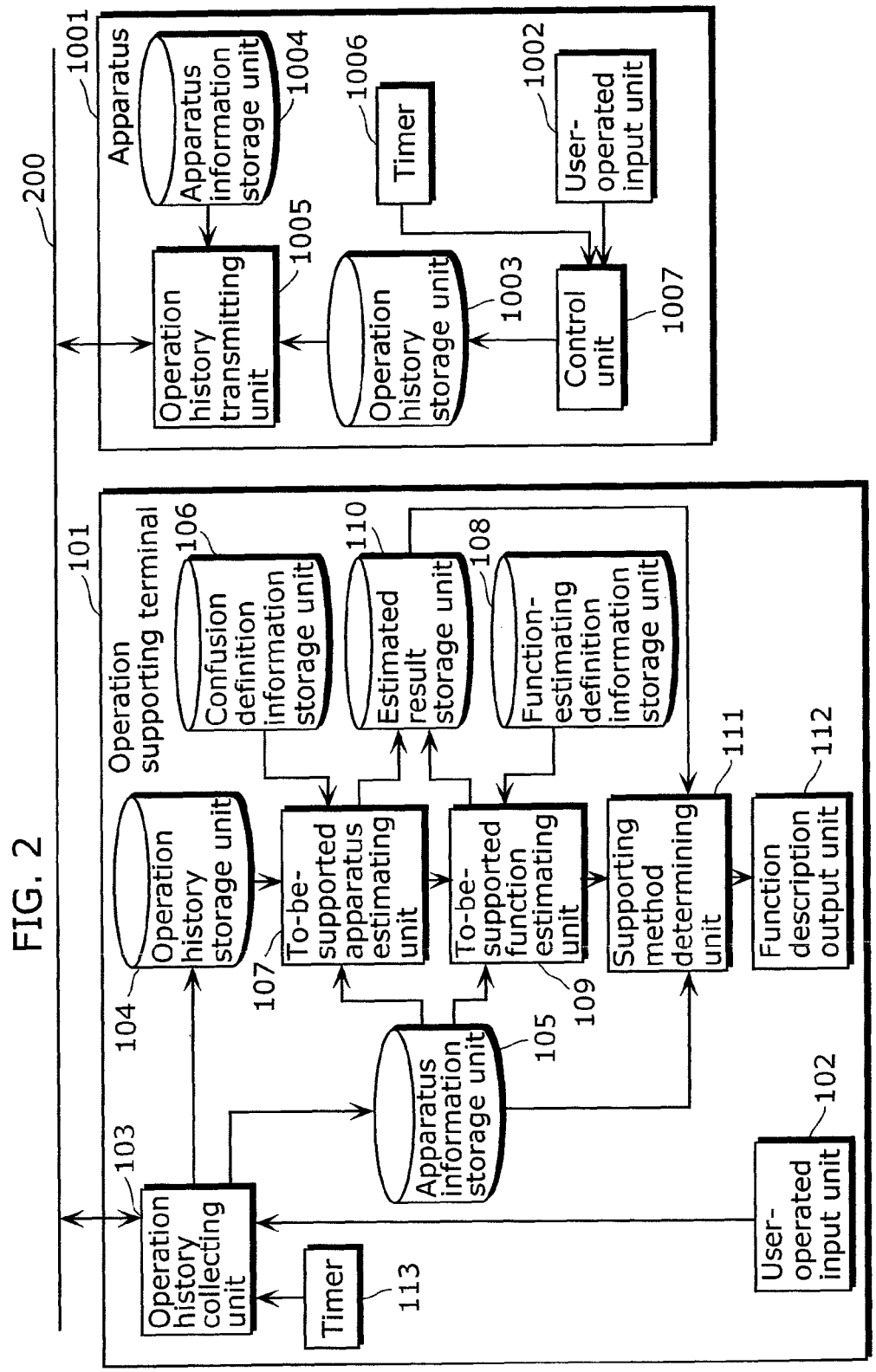
FIG. 2 illustrates a block diagram of a functional configuration that characterizes the operation supporting system according to the embodiment of the present invention.

FIG. 2 illustrates a block diagram of a functional configuration that characterizes the operation supporting system 100 according to the embodiment of the present invention.

As illustrated in FIG. 2, the operation supporting terminal 101 in FIG. 1 includes a user-operated input unit 102, an operation history collecting unit 103, an operation history storage unit 104, an apparatus information storage unit 105, a confusion definition information storage unit 106, a to-be-supported apparatus estimating unit 107, a function-estimating definition information storage unit 108, a to-be-supported function estimating unit 109, an estimated result storage unit 110, a supporting method determining unit 111, a function description output unit 112, and a timer 113.

The user-operated input unit 102 is, for example, buttons, a touch panel, and an arrow key. Upon receipt of an input from the user, the user-operated input unit 102 notifies the operation history collecting unit 103 and others of a result of the input.

Upon receipt of a request for operation support inputted by the user-operated input unit 102, the operation history collecting unit 103 obtains, from the timer 113 to be described later, a time at which the user has requested support in operation. Then, the operation history collecting unit 103 collects, from the apparatuses connected to the network 200, operation history information 104a including (i) operation histories that are time-series information of operations that have been performed by the user during a time period preceding by a predetermined time period from the obtained time and (ii) execution statuses of each of the functions of the apparatuses at the time preceding by the predetermined time period. Furthermore, the operation history collecting unit 103 collects usage information 104b including counts of times the functions have been executed per day of week and per time period, from the apparatuses connected to the network 200. Then, the operation history collecting unit 103 stores the operation history information 104a and the usage information 104b that are collected, in the operation history storage unit 104 to be described later.

Furthermore, the operation history collecting unit 103 collects, from an apparatus connected to the network 200, information on a function executable by the apparatus (such as a count of functions, a specific description of each function, and execution procedures), or information on a user interface of the apparatus (a count of the buttons or operation methods). Furthermore, the operation history collecting unit 103 stores, in the apparatus information storage unit 105 to be described later, the collected information on the functions of each of the apparatuses and the information on the user interface. The information on the functions executable by each of the apparatuses and the information on the interface of each of the apparatuses will be collectively referred to as apparatus information hereinafter.

The operation history storage unit 104 includes, for example, a memory and a hard disk. The operation history storage unit 104 is an example of an operation history storage unit that stores (i) the operation history information 104a including the operation histories and the execution statuses of each of the functions of the apparatuses that are collected by the operation history collecting unit 103 and (ii) the usage information 104b including the counts of times functions that have been executed per day of week and per time period. The operation history information 104a and the usage information 104b will be described in detail later.

The apparatus information storage unit 105 includes, for example, a memory and a hard disk. The apparatus information storage unit 105 is an example of an apparatus information storage unit that stores (i) function description information 105a including descriptions on functions of each of the apparatuses and (ii) interface information 105b including information on complexity of the user interface of each of the apparatuses.

The confusion definition information storage unit 106 includes, for example, a memory and a hard disk. The confusion definition information storage unit 106 is an example of a confusion definition information storage unit that stores information on operations when a general user is confused due to an inability to execute the function desired by the user.

More specifically, the confusion definition information storage unit 106 stores confusion definition information 106a including information in which operations to be performed when the general user is confused (hereinafter simply referred to as "in confusion") about how to operate the apparatuses are patterned (hereinafter simply referred to as confused operation patterns).

The to-be-supported apparatus estimating unit 107 determines, for each of the apparatuses, a degree of matching between an operation history included in the operation history information 104a collected by the operation history collecting unit 103 and an confused operation defined in the confusion definition information 106a, and estimates that an apparatus that is determined to have the degree of matching that exceeds a predetermined threshold is an apparatus having a higher requirement for support in order for the user to perform operations. In other words, the to-be-supported apparatus estimating unit 107 determines whether or not the user is confused about operating each apparatus, by comparing the operation history of each of the apparatuses included in the operation history information 104a and a confused operation pattern included in the confusion definition information 106a. Then, the to-be-supported apparatus estimating unit 107 estimates that the apparatus determined that the user has been confused about the operation is an apparatus having a high requirement for the support.

The function-estimating definition information storage unit 108 is an example of a function-estimating definition information storage unit that stores, for each confused operation pattern, function-estimating definition information 108a including a probability (hereinafter simply referred to as a target probability) that a specific function is a function that the user desires to execute (hereinafter simply referred to as a target function). The function-estimating definition information 108a includes, for example, information indicating that there is a 50 percent probability that a target function is a dubbing function.

The to-be-supported function estimating unit 109 estimates that a target function having a higher target probability is highly likely to be a function that the user desires to execute (a function having a higher requirement for support), from among target functions in each of which an operation history of a corresponding one of the apparatuses included in the operation history information 104a matches an operation pattern included in the function-estimating definition information 108a.

The estimated result storage unit 110 is an example of an estimated result storage unit that stores estimated-apparatus result information 110a and estimated-function result information 110b that are results of estimation by the to-be-supported apparatus estimating unit 107 and the to-be-supported function estimating unit 109, respectively.

The supporting method determining unit 111 determines whether or not to output information on an apparatus to be supported, per apparatus or per function, based on at least one of (i) a target probability of a function included in the apparatus estimated as having a high requirement for the support in operation and (ii) an amount of information that can be outputted by the function description output unit 112 to be described later. In other words, the supporting method determining unit 111 determines a supporting method indicating a main display method to be used when the user is supported in operation.

The function description output unit 112 outputs, to an output medium, such as a display, information on a function description according to the supporting method determined by the supporting method determining unit 111.

The timer 113 notifies the operation history collecting unit 103 and others of a time.

As illustrated in FIG. 2, the apparatus 1001 includes a user-operated input unit 1002, an operation history storage unit 1003, an apparatus information storage unit 1004, and an operation history transmitting unit 1005. As described for FIG. 1, the apparatus 1001 is an apparatus that represents the apparatuses connected to the network 200. Thus, the apparatuses, such as the digital television 2001, have the same configuration as that of the apparatus 1001.

The user-operated input unit 1002 is, for example, buttons, a touch panel, and an arrow key. Upon receipt of an input from the user, the user-operated input unit 1002 notifies a control unit 1007 and others of a result of the input.

The operation history storage unit 1003 is an example of an operation history storage unit that stores (i) operation history information 1003a including operation histories and execution statuses of functions and (ii) usage information 1003b including the counts of times the functions have been executed per day of week and per time period.

The apparatus information storage unit 1004 is an example of an apparatus information storage unit that stores information on functions executable by each of the apparatuses (such as a count of functions, a specific description of each function, and execution procedures), or interface information including information on complexity of the user interface of each of the apparatuses.

Upon receipt of a request from the operation history collecting unit 103 included in the operation supporting terminal 101, the operation history transmitting unit 1005 transmits information on the operation histories and the execution statuses of the functions, and apparatus information, based on the operation history information 1003a and the usage information 1003b that are stored by the operation history storage unit 1003, and the function description information and the interface information that are stored by the apparatus information storage unit 1004. Here, the apparatus information indicates information on the functions executable by each of the apparatuses and information on the complexity of the interface of each of the apparatuses.

A timer 1006 notifies the control unit 1007 to be described later and others of a time.

The control unit 1007 generates operation histories that are time-series information of operations that have been performed by the user, based on a result of the input notified from the user-operated input unit 1002 and the time obtained from the timer 1006. Furthermore, the control unit 1007 executes a function corresponding to the operation inputted by the user-operated input unit 1002, and stores, in the operation history storage unit 1003, the operation history information 1003a in which the executed function and a corresponding one of the generated operation histories are associated with each other. Furthermore, the control unit 1007 calculates a count of times the functions have been executed per name of executed function, per day of week, and per time period. The control unit 1007 stores the calculated count therein in the operation history storage unit 1003 as the usage information 1003b.

Next, various information stored by the operation supporting terminal 101 and the apparatus 1001 in FIG. 2 will be described with reference to FIGS. 3 to 12.

FIG. 3 illustrates an example of the operation history information 104a according to the embodiment of the present invention. Hereinafter, items of the operation history information 104a will be described.

An operation-support requested time 301 indicates a time when the user-operated input unit 102 receives a request for operation support from the user. A time period for obtaining operation histories 302 indicates a predetermined time period preceding from the time when the user requests the support. A time period preceding by the predetermined time period from the time when the user requests supporting the operation will be referred to as a time section Δt. An apparatus ID 303 indicates an ID for identifying an apparatus connected to the network 200. A status 304 indicates a status of an apparatus at the oldest point in time from among the obtained operation histories, in other words, at a point in time preceding by a predetermined time period from the time when the user requests the support. Here, statuses of an apparatus include not only a status in which a function is being executed but also a status in which a function is not executed, for example, a waiting status. An operation number 305 indicates a number for identifying an operation. An operation time 306 indicates a time when the user operated an apparatus connected to the network 200. An interval 307 indicates a time interval from the time when a previous operation had been executed in the time series to the time when a target operation was executed, namely, an interval necessary to execute the target operation. A selection item/button 308 indicates a label of a button that has been pressed in each operation and a menu item that has been selected. An executed function 309 indicates a function that has been executed in each operation.

For example, the operation history information 104a in FIG. 3 indicates information in a status in which the operation-support requested time is 19:55, and the time period for obtaining operation histories is 5 minutes. Furthermore, the operation history information 104a indicates that a status "5 minutes" prior to "19:55" of an apparatus having an apparatus ID "0001_T" is a "broadcast video output (8ch)". Furthermore, the operation history information 104a indicates that the apparatus having the apparatus ID "0001_T" is operated at "19:53:29" that is the second oldest time of the operation from among the times operated in the time section Δt. Furthermore, the operation history information 104a indicates that the apparatus having the apparatus ID "0001_T" is operated with 1 second of a time interval between operations "1" and "2" that are indicated in the operation number 305. Furthermore, the operation history information 104a indicates that a button selected in the operation "2" indicated in the operation number 305 is an "input switch" button, and the function executed by the operation "2" is "input switch" for switching between inputs, in the apparatus having the apparatus ID "0001_T".

FIG. 4 illustrates an example of the usage information 104b according to the embodiment of the present invention. Hereinafter, items of the usage information 104b will be described.

An apparatus ID 401 indicates an ID for identifying an apparatus connected to the network 200. An executed function 402 indicates a function that has been executed from among functions included in the apparatus. A day of week 403 indicates a day of week when a function has been executed. A function start time period 404 is a time period including a start time at which a function has been executed. Here, counts of the executed functions are stored in columns of the time periods (such as 0 to 2 o'clock and 2 to 4 o'clock) indicated in the function start time period 404.

The usage information 104b in FIG. 4 indicates, for example, that an apparatus having an apparatus ID "0005_W" has done the "laundry (normal mode)" "6" times during "19 to 20 o'clock" on "Monday".

FIG. 5 illustrates an example of the function description information 105a according to the embodiment of the present invention. Hereinafter, items of the function description information 105a will be described.

An apparatus ID 501 indicates an ID for identifying an apparatus connected to the network 200. A function number 502 indicates a number for identifying a function of the apparatus indicated by the apparatus ID 501. A function name 503 indicates a name of the function of the apparatus indicated by the apparatus ID 501. A function description 504 indicates a description of the function corresponding to the function number 502 and the function name 503, and is stored as text information.

For example, the function description information 105a in FIG. 5 indicates that an apparatus having an apparatus ID of "0003_R" includes a function having a function number "1" and a function name "scheduled recording by specifying recording time", and indicates a function description of the function "scheduled information for manually setting scheduled date, scheduled channel, start time, etc.".

FIG. 6 illustrates an example of interface information 105b according to the embodiment of the present invention. Hereinafter, items of the interface information 105b will be described.

An apparatus ID 601 indicates an ID for identifying an apparatus connected to the network 200. A function count 602 indicates a count of functions executable by the apparatus indicated by the apparatus ID 601.

An available IF 603 indicates a type of a user interface available in an operation of the apparatus indicated by the apparatus ID 601. The types of user interfaces are categorized into a menu type and a button type. The menu-type interface is a user interface used in mobile phones, for example. With the menu-type interface, the user selects a menu probably the most suitable for reaching a function that the user desires to execute from among menus displayed on a screen to execute a target function (for example, a function for replying a mail). In contrast, the button-type interface is a user interface used in laundry machines and previous-generation televisions, for example. With the button-type interface, the user selects a button in a remote control or in a main body of the apparatus to execute a target function (for example, changing a channel).

A collected-time-period use IF 604 indicates a type of a user interface, of each apparatus, that is used in a time section Δt. A collected-time-period use operating device 605 indicates an operating device (a remote control or a main body) of each apparatus that has been used in a time section Δt. The collected-time-period use operating device 605 stores information only when the user uses a button-type interface.

A button count/hierarchy level count 606 indicates a count of buttons or hierarchy levels included in each apparatus. When a button-type interface is used, the button count/hierarchy level count 606 indicates a count of buttons, and when a menu-type interface is used, the button count/hierarchy level count 606 indicates a count of hierarchy levels. The count of buttons is a count excluding a count of buttons indicating only numeric characters. Furthermore, when a remote control has a cover and is equipped with buttons under the cover, in the case where the operation histories show opening of the cover, the count of buttons includes a count of buttons under the cover.

A single-function button count 607 indicates a count of buttons with each of which can execute a single function in the button-type interface. An executable function rate 608 indicates a rate of functions executable (hereinafter simply referred to as executable function rate) by a user interface and an operating device of each apparatus that has been used in a time section Δt.

More specifically, a television 1 having "0001_T" as the apparatus ID 601 has "50" executable functions in FIG. 6. Furthermore, the interface of the television 1 in the time section Δt is of "menu type". Here, the television 1 may be of the button-type interface, the count of functions achievable by the menu-type interface is 45, and the count of functions only achievable by the button-type interface is 5. Thus, the executable function rate 608 is "90%" as indicated.

FIG. 7A illustrates an example of the confusion definition information 106a according to the embodiment of the present invention. Hereinafter, items of the confusion definition information 106a will be described.

A confused operation pattern 701 indicates a pattern of confused operations of the user. More specifically, the confused operation pattern 701 indicates information in which operations probably performed by the general user who is confused about how to operate apparatuses are patterned. A set value 702 is a threshold for determining that the user is confused, based on how an operation similar to a confused operation pattern defined in the confused operation pattern 701 is performed by the user.

For example, when the confused operation pattern 701 is "repeat" and the to-be-supported apparatus estimating unit 107 in FIG. 2 detects the "repeat" pattern twice or more according to the set value 702, the to-be-supported apparatus estimating unit 107 determines that the user is confused. Similarly, when the confused operation pattern 701 is "retrial" and the to-be-supported apparatus estimating unit 107 detects the "retrial" pattern twice or more, the to-be-supported apparatus estimating unit 107 determines that the user is confused. Similarly, when the confused operation pattern 701 is "suspension" and the to-be-supported apparatus estimating unit 107 detects the "suspension" pattern 3 times or more each with a suspension for 5 seconds or longer, the to-be-supported apparatus estimating unit 107 determines that the user is confused.

FIG. 7B illustrates examples of definitions of confused operation patterns in FIG. 7A.

The "repeat" of a confused operation pattern indicates a pattern in which similar patterns are repeated when input operations are divided into groups. The specific example in FIG. 7B shows that after operations "A", "B", and "C" are sequentially performed, again the sequence of the operations "A", "B", and "C" is repeated.

The "retrial" of the confused operation pattern indicates a pattern of, for example, returning to a specific hierarchical level and selecting another selection item in operations of an interface having menu hierarchies. The specific example in FIG. 7B shows that after operations "A", "B", and "C" are sequentially performed, the operations "A", "B", and "C" are canceled with selection of a "return/cancel" button.

The "suspension" of the confused operation pattern indicates a pattern of input operations at intervals of a predetermined time or longer. The specific example in FIG. 7B shows 6 seconds of suspension after operations "A" and "B" that have been sequentially performed, and then 7 seconds of suspension before an operation "D".

The to-be-supported apparatus estimating unit 107 in FIG. 2 may not necessarily determine that the user is confused even when a particular operation history matches one of the confused operation patterns. More specifically, even when an operation of pressing a button for scrolling down a television program list holds true for the "repeat" pattern in which similar operations are repeated, the to-be-supported apparatus estimating unit 107 does not necessarily have to determine that the user is confused. Furthermore, even when the operation of pressing a button for scrolling down the television program list holds true for the "suspension" pattern in which operations are performed at intervals of a predetermined time or longer, the to-be-supported apparatus estimating unit 107 does not necessarily have to determine that the user is confused.

Furthermore, a plurality of thresholds may be set as the set value 702 according to the interface information 105*b* stored by the apparatus information storage unit 105. For example, different thresholds between the menu-type interface and the button-type interface may be stored as the set value 702. Since the user tends to perform operations using a trial-and-error method in the menu-type interface rather than the button-type interface, the threshold of each of (i) a count of repeated patterns, (ii) a count of retrials, and (iii) a count of suspensions is set larger in the menu-type interface.

Although the confused operation patterns are general confused operation patterns independent of any apparatus, the confused operation patterns may differ in each apparatus.

FIG. 8 illustrates an example of the confusion definition information 106*a* when a confused operation pattern is defined for each apparatus. Hereinafter, items of the confusion definition information 106*a* when the confused operation pattern is defined for each apparatus will be described.

An apparatus ID 801 indicates an ID for identifying an apparatus connected to the network 200. The confused operation pattern 802 indicates information in which operations probably performed by the general user who is confused about how to operate each apparatus are patterned for each apparatus. A set value 803 is a threshold for determining that the user is confused, based on how an operation similar to a confused operation pattern defined in the confused operation pattern 802 is performed by the user.

In the confusion definition information 106*a* in FIG. 8, for example, repeating an operation of opening the cover of a remote control of the apparatus having the apparatus ID of "0003_R" twice or more indicates that the user is confused.

Furthermore, as indicated in FIG. 8, the confused operation pattern 802 is defined for each apparatus, using selected item names of menus or labels of buttons for each apparatus. The confused operation pattern 802 may be a pattern assumed by a system developer, or may be a pattern defined based on data obtained by evaluation experiments performed on plural subject persons.

FIG. 9 illustrates an example of the function-estimating definition information 108*a* according to the embodiment of the present invention. As illustrated in FIG. 9, the function-estimating definition information 108*a* defines associations between operation patterns and target functions. Hereinafter, items of the function-estimating definition information 108*a* will be described.

An apparatus ID 901 indicates an ID for identifying an apparatus connected to the network 200. An operation pattern 902 indicates a pattern of an input operation by the user. A target function 903 indicates a function that is highly likely to be desired by the user in an input operation, when a match between an operation from among the input operations of the user and the operation pattern 902 is detected. A target probability 904 indicates a probability that the target function 903 is a function to be desired by the user in an input operation when the match between the operation and the operation pattern 902 is detected.

For example, "68.5%" of the target probability 904 in FIG. 9 indicates a probability that a function desired by the user is "dubbing" when the user selects a "list to be reproduced" of the apparatus having the apparatus ID of "0003_R" and then selects "sub-menu".

The function-estimating definition information 108*a* may be generated, for example, by quantifying the associations between operation patterns and target functions obtained in the evaluation experiments performed on many subject persons.

FIG. 10 illustrates an example of the estimated-apparatus result information 110*a* according to the embodiment of the present invention. Hereinafter, items of the estimated-apparatus result information 110*a* will be described.

An apparatus ID 1051 indicates an ID for identifying an apparatus connected to the network 200. A confused level 1052 indicates a degree in which the user is confused when the user cannot execute a function desired by the user. A within-level rank 1053 indicates a rank in each of the confused levels. An aggregate rank 1054 indicates a result of obtaining an aggregate rank in all of the confused levels based on the confused level 1052 and the within-level rank 1053. A possibility of others 1055 indicates a possibility that another user uses the apparatus.

For example, the estimated-apparatus result information 110a in FIG. 10 shows that the apparatus having an apparatus ID "0001_T" is in "level 4" as the confused level, "4"-th rank as the within-level rank, and "4"-th rank as the aggregate rank, and the possibility that another user uses the apparatus is "present".

FIG. 11 illustrates an example of the estimated-function result information 110b according to the embodiment of the present invention. Hereinafter, items of the estimated-function result information 110b will be described.

An apparatus ID 1101 indicates an ID for identifying an apparatus connected to the network 200. A confused level 1102 indicates a degree in which the user is confused when the user cannot execute a function desired by the user. An estimated rank 1103 indicates a rank in descending order of estimated scores of functions estimated as functions desired by the user. An estimated function 1104 indicates a function estimated as the user's target. An estimated score 1105 indicates a probability of being a function desired by the user.

For example, when the user operates a recorder having the apparatus ID of "0003_R" in the estimated-function result information 110b in FIG. 11, one of the functions that the user desire to execute is "scheduled recording using EPG". This is because, from among the functions of the apparatus ID of "0003_R" in the estimated-function result information 110b in FIG. 11, the function having the highest estimated rank is a function of "scheduled recording using EPG".

Furthermore, FIG. 11 shows that the estimated score of "scheduled recording using EPG" is 68.5.

FIG. 12 illustrates an example of the operation history information 1003a held by the apparatus 1001 connected to the operation supporting terminal 101 according to the embodiment of the present invention via the network 200. Hereinafter, items of the operation history information 1003a will be described.

An apparatus ID 1201 indicates an ID for distinguishing the apparatus 1001 from other apparatuses. An operating date 1202 indicates a date when a function has been executed. A function-executed time period 1203 indicates a time period when the function has been executed. An operating day of week 1204 indicates a day of week when the function has been executed. An executed function name 1205 indicates a name of the function that has been executed.

For example, the operation history information 1003a in FIG. 12 shows operation histories on the apparatus having an apparatus ID "0005_W", and that a function "laundry (quick mode)" has been executed during a time period "20:30-21:10" on "Wednesday", "2007/5/23".

Since the usage information 1003b, the function description information, and the interface information that are held by the apparatus 1001 have the same items as those of the usage information 104b, the function description information 105a, and the interface information 105b that are held by the operation supporting terminal 101, respectively, the illustrations are omitted. The difference with the information held by the operation supporting terminal 101 is that data included in the usage information 1003b, the function description information, and the interface information is information solely on the apparatus 1001.

Next, basic operations of the operation supporting terminal 101 having the aforementioned configuration will be described.

Figure 13:
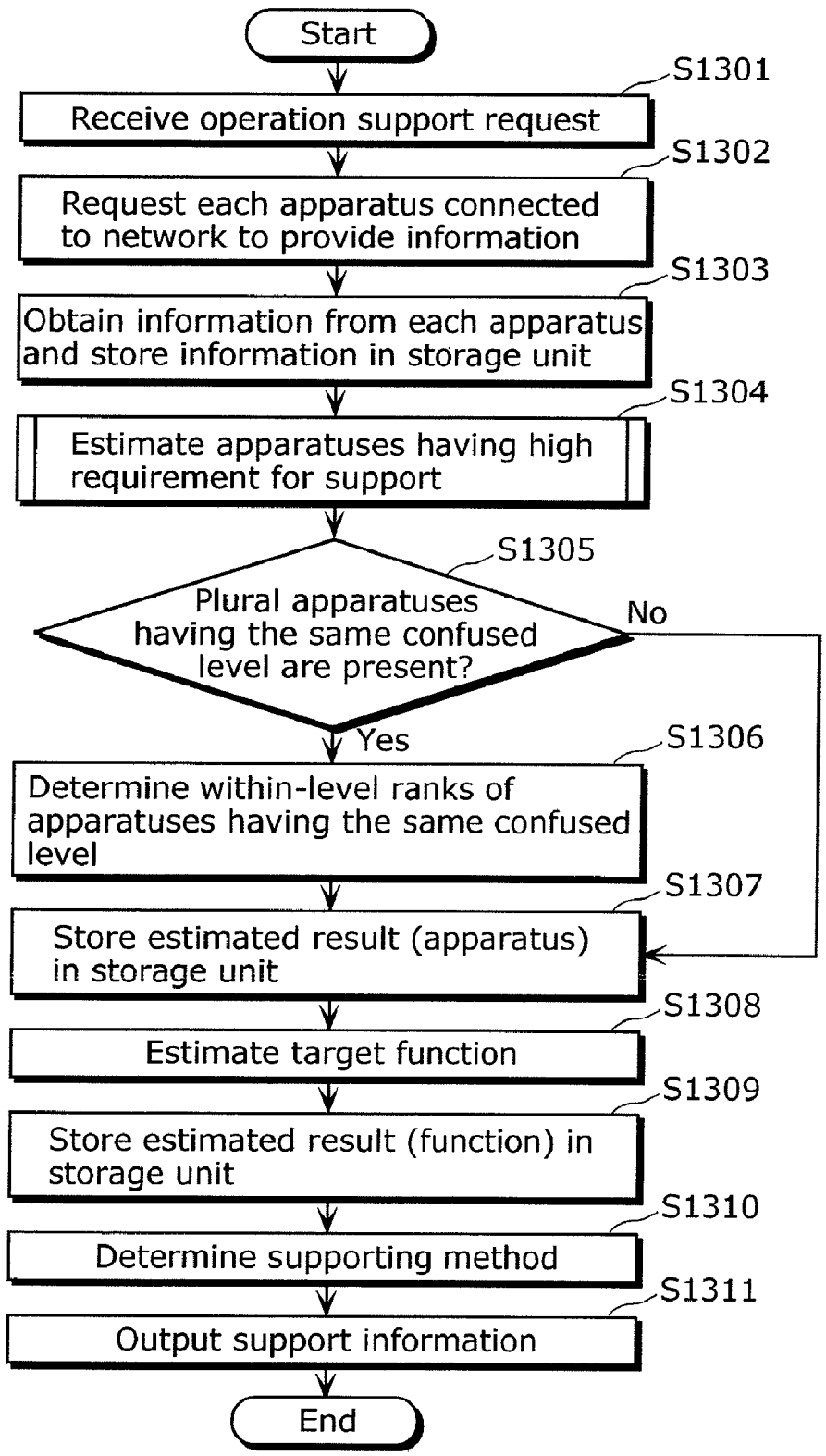
FIG. 13 shows a flowchart of processing of the operation supporting terminal according to the embodiment of the present invention for providing operation support to the user.

FIG. 13 shows a flowchart of processing of the operation supporting terminal 101 for providing operation support to the user according to the embodiment of the present invention.

First, the user-operated input unit 102 receives an input of the user who needs to be supported in operating an apparatus as an operation support request, and notifies the operation history collecting unit 103 of the operation support request (S1301). Here, the operation support request inputted by the user is solely information indicating a request for support. The examples of the operation support request includes operations of pressing a specific button of the operation supporting terminal, turning on the operation supporting terminal, and opening a cover of the operation supporting terminal.

Next, upon receipt of the operation support request from the user-operated input unit 102, the operation history collecting unit 103 obtains a time from the timer 113. Furthermore, the operation history collecting unit 103 requests each apparatus connected to the network 200 to provide the operation history information including operation histories and execution statuses of the functions, and the apparatus information (S1302). The operation histories of each apparatus to be requested are operation histories in a time section Δt preceding by a predetermined time period from a time when the apparatus receives the support request. Furthermore, the execution statuses of functions of each apparatus to be requested are use statuses of each apparatus at a time preceding by a predetermined time period from the time when the apparatus receives the support request. Furthermore, the apparatus information of each apparatus to be requested includes information on a user interface of the apparatus (such as a count of buttons and operation methods) and information on a function description (such as a name, details, and execution procedures of a function).

The preceding predetermined time period from the time when the apparatus receives the support request, for example, may be set in advance by a system developer, or may be determined by the operation history collecting unit 103 based on times when no input operation is performed on all of the apparatuses on the network 200 for a predetermined time or longer.

Next, the operation history collecting unit 103 obtains the operation history information and the apparatus information transmitted from the operation history transmitting unit 1005 of each of the apparatuses. The operation history collecting unit 103 stores the obtained operation history information in the operation history storage unit 104. Furthermore, the operation history collecting unit 103 stores the obtained apparatus information in the apparatus information storage unit 105 (S1303).

Next, the to-be-supported apparatus estimating unit 107 estimates apparatuses each having a high requirement for support in operation based on the operation history information stored in the operation history storage unit 104 (S1304). More specifically, the to-be-supported apparatus estimating unit 107 determines a confused level obtained by quantifying a degree in which the user is confused under an assumption that an apparatus requiring support in operation is an apparatus about which the user is confused in operation. Then, the to-be-supported apparatus estimating unit 107 estimates that an apparatus having a higher confused level determined is an apparatus having a higher requirement for support in operation. The processing will be described in detail with reference to FIGS. 14 and 15.

Next, the to-be-supported apparatus estimating unit 107 determines whether or not there are plural apparatuses having the same confused level as that of the apparatus estimated that the user needs the operation support (S1305). Here, when there are plural apparatuses having the same confused level (Yes in S1305), the to-be-supported apparatus estimating unit 107 determines degrees in which the user is confused, in other words, within-level ranks obtained by ranking the apparatuses having the same confused level according to the degrees in which the user needs the operation support (S1306). The details of the processing in Step S1307 will be described later. On the other hand, when there are not the plural apparatuses having the same confused level (No in S1305), the processing proceeds to Step S1307 to be described later.

Next, the to-be-supported apparatus estimating unit 107 stores, in the estimated result storage unit 110 as the estimated-apparatus result information 110a, the confused levels and the within-level ranks that are obtained in Steps S1304 to 1306 as well as the corresponding apparatus information (S1307).

Next, the to-be-supported function estimating unit 109 compares the operation histories included in the operation history information 104a with the operation patterns defined in the function-estimating definition information 108a. When detecting a matching pattern, the to-be-supported function estimating unit 109 estimates a target function corresponding to the matching pattern as a function for which the user needs the operation support (S1308). Hereinafter, the function estimated in such a manner will be described as an estimated function. Here, functions of all of the apparatuses each estimated as having a high requirement for support do not have to be functions to be estimated. Instead, the functions to be supported may be estimated from among only the apparatuses having a higher probability of being supported. For example, the functions to be supported may be estimated from among only the apparatuses having the highest confused level.

Next, the to-be-supported apparatus estimating unit 107 obtains, from the function-estimating definition information 108a, a target probability of an estimated function. Then, the to-be-supported apparatus estimating unit 107 stores in the estimated result storage unit 110 as the estimated-function result information 110b, estimated functions, the estimated scores, and ranks in descending order of the estimated scores as well as the corresponding apparatus information (S1309).

Next, the supporting method determining unit 111 determines a supporting method for displaying information on an apparatus to be supported on a screen, per apparatus or per function, according to (i) a count of apparatuses requiring the operation support obtained with reference to the estimated-apparatus result information 110a, (ii) the estimated scores of estimated functions obtained with reference to the estimated-apparatus result information 110b, and (iii) the amount of information that can be outputted to the function description output unit 112 (S1310). Here, the amount of information that can be outputted indicates an amount of information that can be displayed on, for example, a display. For example, when 4 pieces of information for operation support can be displayed on a display, the amount of information that can be outputted is indicated as "4".

Finally, the function description output unit 112 outputs information necessary for support, such as function description information of the apparatus estimated as having a high requirement for the support, according to the supporting method determined by the supporting method determining unit 111, with reference to the function description information 105a (S1311).

Figure 14:
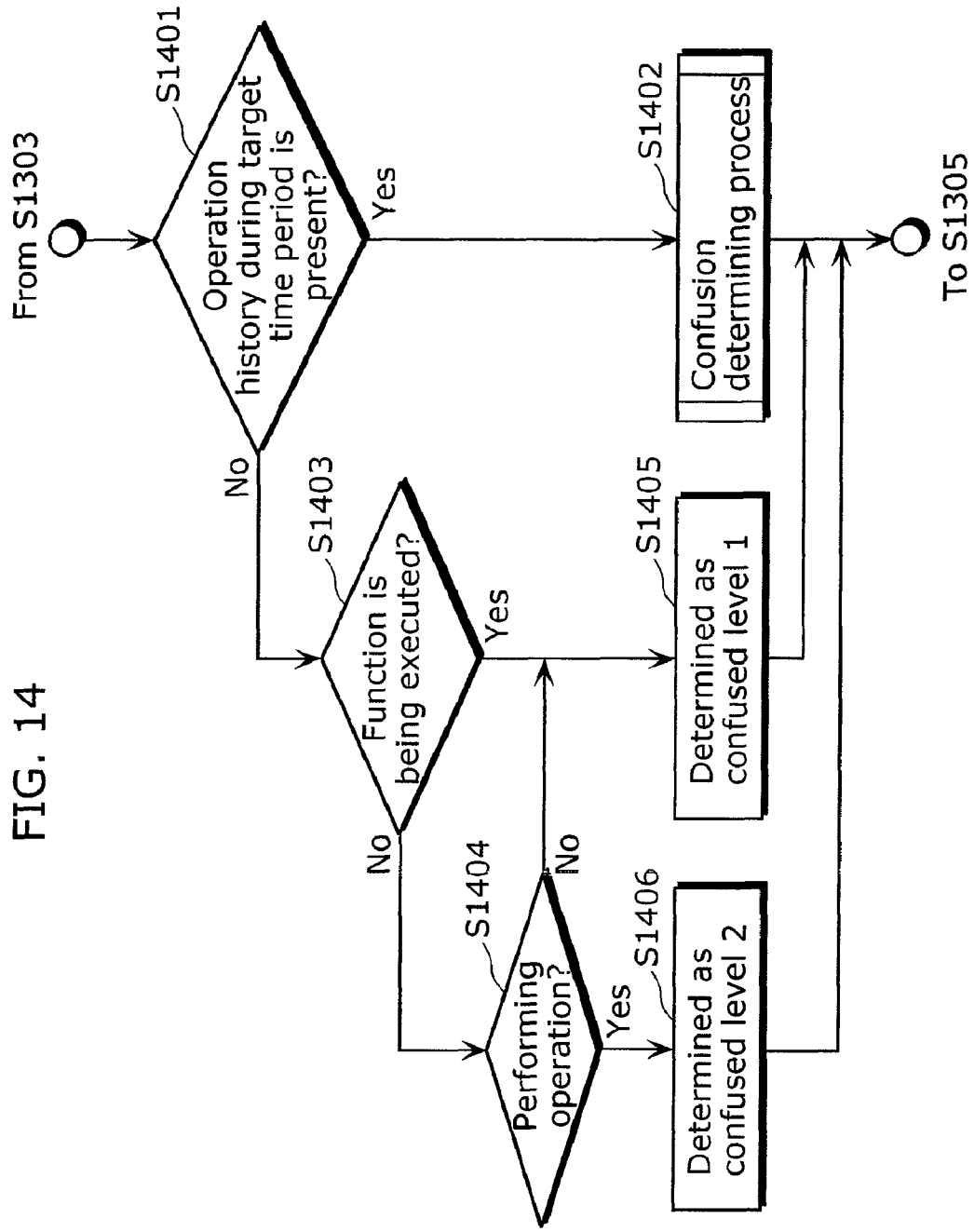
FIG. 14 shows a flowchart of detailed processing of Step S1304 in FIG. 13.

FIG. 14 shows a flowchart of detailed processing of Step S1304 in FIG. 13.

First, the to-be-supported apparatus estimating unit 107 determines, for each apparatus, whether or not the collected operation history information 104a includes operation histories of the user (S1401). When an apparatus receives an input operation of the user (Yes in S1401), the to-be-supported apparatus estimating unit 107 determines a confused level based on the operation histories (S1402). On the other hand, when the apparatus does not receive an input operation of the user (No in S1401), the to-be-supported apparatus estimating unit 107 determines whether or not a function is being executed in the time section Δt (S1403).

Here, when the apparatus is executing, for example, a "dubbing" function at the support request time (Yes in S1403), the to-be-supported apparatus estimating unit 107 determines the apparatus that is executing the function as an apparatus having the lowest probability that the user is confused (in other words, an apparatus with the confused level 1 indicating the lowest probability that the user needs the operation support) (S1405). This is because a status in which the a function is being executed, such as a status of displaying a television program, a status of reproducing music, and a status of doing a laundry indicates that the user has completed execution of the function. In other words, a status in which a function is being executed indicates that the user is not confused about the operation for executing the function.

Here, when the apparatus does not execute a function at the support request time (No in S1403), the to-be-supported apparatus estimating unit 107 determines whether or not the user is performing the operation based on a status of the apparatus in the time section Δt (S1404). For example, when there is no input operation while a menu screen is displayed in the time section Δt, the to-be-supported apparatus estimating unit 107 determines that the user is performing an operation. Furthermore, when an apparatus such as a laundry machine that is always operated after turning on the apparatus does not receive any input operation despite the on-state of the apparatus in the time section Δt, the to-be-supported apparatus estimating unit 107 determines that the user is performing the operation.

Here, when the to-be-supported apparatus estimating unit 107 determines that the user is operating an apparatus (Yes in S1404), the to-be-supported apparatus estimating unit 107 determines that the apparatus is an apparatus of a confused level 2 (S1406). On the other hand, when the to-be-supported apparatus estimating unit 107 determines that the user is not operating an apparatus (No in S1404), the to-be-supported apparatus estimating unit 107 determines that the apparatus is an apparatus of a confused level 1 (S1405).

Figure 15:
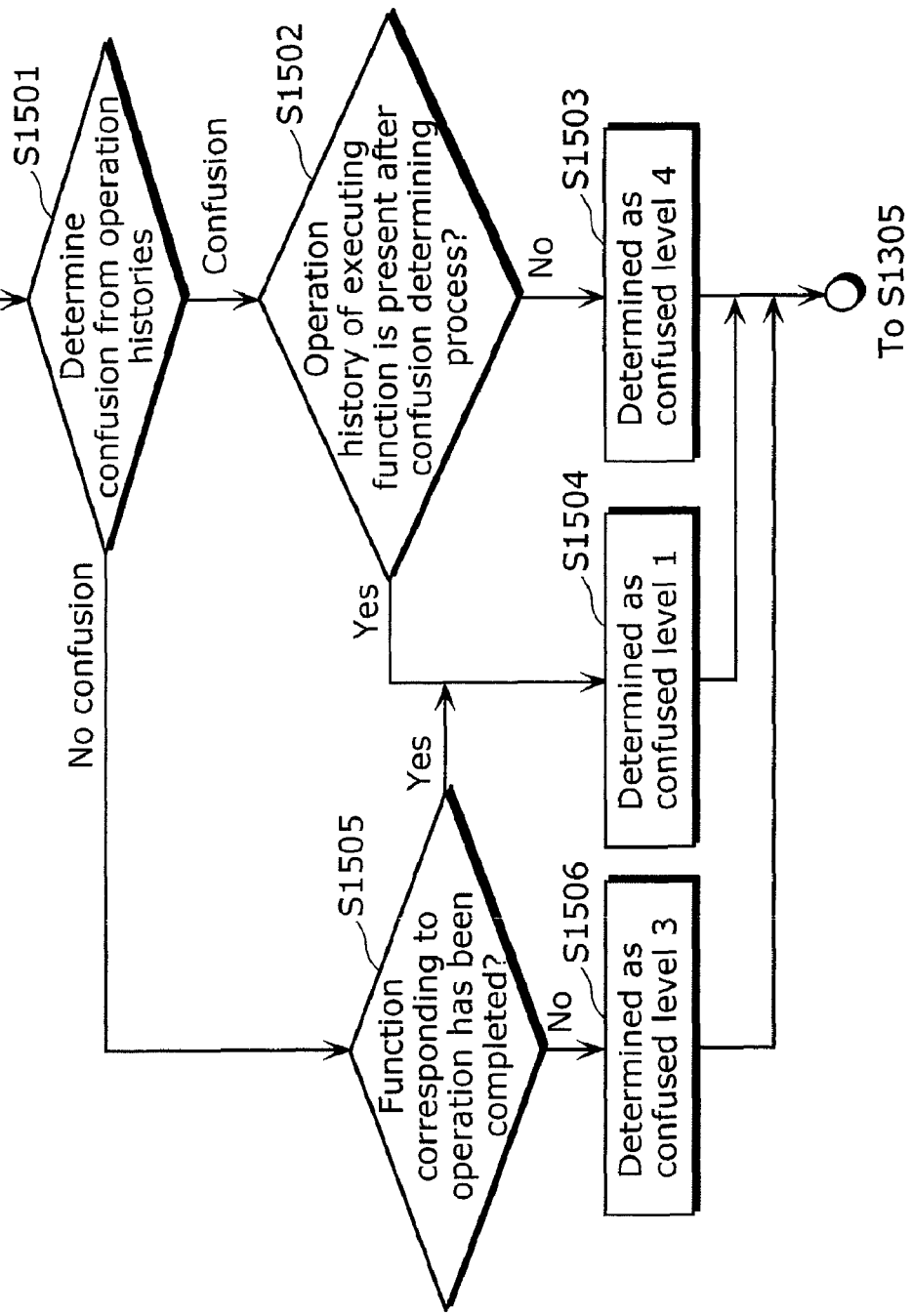
FIG. 15 shows a flowchart of detailed processing of a confusion determining process in Step S1402 of FIG. 14.

FIG. 15 shows a flowchart of detailed processing of a confusion determining process in Step S1402 of FIG. 14.

First, the to-be-supported apparatus estimating unit 107 determines whether or not the user is confused about operating an apparatus, by comparing an operation history in the operation history information 104a and a confused operation pattern included in the confusion definition information 106a (S1501). As a result of determination that the user is confused (confusion in S1501), the to-be-supported apparatus estimating unit 107 further determines whether or not the collected operation history information 104a includes an operation history of executing a function after the operation history of the determined confused state (S1502). As a result of the determination, when the to-be-supported apparatus estimating unit 107 determines that there is no operation history of executing the function (No in S1502), the to-be-supported apparatus estimating unit 107 determines that the apparatus is an apparatus having the highest probability of being confused (in other words, an apparatus having a confused level 4 indicating the highest probability that the user needs the operation support) (S1503). When the to-be-supported apparatus estimating unit 107 determines that the operation history of executing a function is present and the input operation for executing the function has been completed in the operation history, the to-be-supported apparatus estimating unit 107 determines that it is highly likely that the user has overcome the confusion because he/she was confused in the past but understands the method for executing the function later. Then, when the to-be-supported apparatus estimating unit 107 determines that the operation history of executing the function is present (Yes in S1502), it determines that the apparatus is an apparatus having the confused level 1 indicating the lowest probability that the user needs the operation support (S1504).

A state in which the input operation for executing the function has been completed indicates that the apparatus has completed the input operation for executing a function, for example, dubbing.

On the other hand, when the to-be-supported apparatus estimating unit 107 determines that the user is not confused (no confusion in S1501), it determines whether or not the input operation for executing the function has been completed in the operation history (S1505).

Here, in the case where an operation history indicates completion of the input operation for executing the function (Yes in S1505), since it is highly likely that the user has achieved the target function, the to-be-supported apparatus estimating unit 107 determines that the apparatus is an apparatus having the confused level 1 indicating the lowest probability that the user needs the operation support (S1504). On the other hand, in the case where the input operation in the operation history has not been completed when the function is to be executed (No in S1505), since the user is executing the function, the to-be-supported apparatus estimating unit 107 determines that the apparatus is an apparatus having a confused level 3 indicating there is some probability that the user is confused (S1506).

With the processes, the operation supporting terminal 101 can automatically determine whether or not the user is confused based on each of operation histories of apparatuses to be supported and estimate that the apparatus about which the user is determined to be confused is an apparatus for which the user needs the operation support. Furthermore, the operation supporting terminal 101 can estimate a function using the operation histories used for estimating an apparatus to be supported. The operation supporting terminal 101 leads to a function desired by the user based on these estimation results, such that the burden until the user starts executing the function desired by the user can be reduced.

Next, a specific example of the process of determining within-level ranks among apparatuses having the same confused level, that is, the process of Step S1306 in FIG. 13 will be hereinafter described.

When the to-be-supported apparatus estimating unit 107 determines that the apparatuses belong to the same confused level in Step S1304 of FIG. 13, it is necessary to rank the apparatuses of the same confused level for determining which apparatus preferentially needs the operation support. For example, when 3 apparatuses are all determined to belong to the confused level 3, the 3 apparatuses for determining which apparatus preferentially needs the operation support are ranked using information different from the information for use in determining the confused level. Here, the apparatuses belonging to the same confused level are apparatuses estimated using the same estimation method as having the high requirement for the support.

More specifically, the apparatuses are ranked using 3 pieces of information including time information, interface information, and use status information.

A method for ranking the apparatuses using the time information will be described as the first method.

In the method for ranking the apparatuses using the time information, the to-be-supported apparatus estimating unit 107 specifies a time when the user last operated each of the apparatuses with reference to the operation history information 104a, and estimates that, from among the apparatuses, an apparatus corresponding to a shorter time period from the specified time to the time when the user requests the support is an apparatus having a higher requirement for the support.

More specifically, the to-be-supported apparatus estimating unit 107 calculates a time difference between an operation-support requested time and a last input operation time that are included in the operation history information 104a, using the selection item/button 308 and the operation time 306 that indicate input operations. The to-be-supported apparatus estimating unit 107 ranks an apparatus having the shorter time difference to be highly likely an apparatus for which the user needs the operation support. This is because even when the operation history information 104a includes the operation history of an operation being estimated that the user is confused, after a predetermined time has passed, the to-be-supported apparatus estimating unit 107 estimates that the user is not requesting the operation support. In other words, when an apparatus has the longer time difference, it is highly likely that the user gives up executing a target function, the user is taking another measure, such as referring to a manual printed on a paper document, or others. Thus, the apparatus having the longer time difference is probably the apparatus for which the user does not need an immediate support by the operation supporting terminal 101.

Furthermore, it is highly likely that a user other than the user who has requested the support in operation uses the apparatus receiving the input operation at the operation-support requested time. Since it is less likely that the apparatus receiving the input operation at the operation-support requested time is an apparatus for which the user who has requested the support desires to provide the support in operation using the operation supporting terminal 101, the apparatus is ranked as an apparatus that is less likely an apparatus having a high requirement for the support.

The operation histories to be collected from each apparatus may also include operation histories collected after a predetermined time from the operation-support requested time, for example, operation histories after 1 or 2 seconds later from the operation-support requested time. Thus, since it is highly likely that another user uses the apparatus receiving input operations after the support is requested, the to-be-supported apparatus estimating unit 107 can increase the precision of identifying an apparatus operated by the other user. Furthermore, the operation history collecting unit 103 may collect additional operation histories at predetermined time intervals after the support is requested. Each time the operation history collecting unit 103 collects operation histories at the predetermined time intervals, the to-be-supported apparatus estimating unit 107 may determine whether or not there is some probability that other users use the apparatus, and reflect a determination result of the previous ranking.

Furthermore, when the to-be-supported apparatus estimating unit 107 ranks the needs for supporting operations using a difference between an operation-support requested time and a last input operation time, it may rank the needs in consideration of a time period necessary for the operation supporting terminal 101 to display the operation support from the operation-support requested time.

For example, the to-be-supported apparatus estimating unit 107 obtains position information of the operation supporting terminal 101 and position information of an apparatus to be supported. Then, the to-be-supported apparatus estimating unit 107 estimates, using the obtained plurality of position information, a time period consumed by the user until the user uses the operation supporting terminal 101, and reflects the estimated time period on the ranking processes. More specifically, when the operation supporting terminal 101 is in a living room, and detects a television in the living room and a laundry machine that is not in the living room as apparatuses to be supported, it takes some time for the user to hold the operation supporting terminal 101 because the user is in a room where the laundry machine is. Thus, the to-be-supported apparatus estimating unit 107 uses a time obtained by subtracting the time necessary for the user to hold the operation supporting terminal 101 as the time difference between an operation-support requested time and a last input operation time to the laundry machine.

Furthermore, the to-be-supported apparatus estimating unit 107 may consider a start-up time of the operation supporting terminal 101. For example, when the start-up time of the operation supporting terminal 101 is 30 seconds, and the operation supporting terminal 101 records an operation support request as an event upon startup, the to-be-supported apparatus estimating unit 107 does not estimate that an apparatus receiving an input operation during a time period preceding by 30 seconds from the operation-support requested time is an apparatus having a high requirement for the support.

By considering a time period required from a last input operation time to the operation-support requested time received by the operation supporting terminal 101, the apparatuses can be ranked according to each use status, compared to the ranking using the simple time difference between the operation-support requested time and the last input operation time.

A method for ranking the apparatuses using the interface information will be described as the second method.

In the method for ranking the apparatuses using the interface information, the to-be-supported apparatus estimating unit 107 estimates that as the interface is more complex, an apparatus including the interface has a high requirement for support based on the interface information 105b.

More specifically, for example, the to-be-supported apparatus estimating unit 107 may perform the ranking under assumption that an apparatus having a larger count of buttons or having deeper menu hierarchies is an apparatus having a higher probability that the user is confused about its operation, in other words, an apparatus that is highly likely to have a high requirement for support in operation. Furthermore, in consideration of a count of functions held by each apparatus, the to-be-supported apparatus estimating unit 107 may perform the ranking under assumption that an apparatus having a larger count of functions but a smaller count of buttons (that is, a value obtained by dividing the count of buttons by the count of functions is smaller) is an apparatus that is highly likely to have a high requirement for support in operation. Although only information on the count of buttons or on the depth of menu hierarchies is used in the ranking processes, the to-be-supported apparatus estimating unit 107 may perform the ranking using the single-function button count 607 in FIG. 6, that is, the ranking using a value obtained by dividing, by the count of functions, a count of buttons obtained by subtracting a count of buttons with each of which can execute a single function upon a press of the button, from the total count of buttons. Furthermore, the to-be-supported apparatus estimating unit 107 may perform the ranking using the executable function rate 608 in FIG. 6, that is, information indicating to what extent functions among the total functions can be executed through an interface that has been used by the user.

A method for ranking the apparatuses using the use status information will be described as the third method.

In the method for ranking the apparatuses using the use status information, the to-be-supported apparatus estimating unit 107 specifies a count of times functions have been executed during a time period including a time when support is requested, with reference to the usage information 104b, and estimates that an apparatus has a high requirement for support as the specified count of times is smaller.

More specifically, the to-be-supported apparatus estimating unit 107 ranks the apparatuses using the usage information of a day of week and of a time period of each apparatus corresponding to the operation-support requested time included in the usage information 104b of FIG. 4. The reason why the apparatus has a high requirement for support in operation is based on the idea that the users develop a routine for using apparatuses, and it is highly likely that an apparatus less-frequently used on a day of week or during a time period is used not by the user who normally uses the apparatus but by the user who does not normally use the apparatus. As the more specific processing, the to-be-supported apparatus estimating unit 107 obtains, from the usage information 104b as shown in FIG. 6, respective counts of times functions of the apparatuses necessary to be ranked have been executed during the day of week and the time. Then, the to-be-supported apparatus estimating unit 107 determines that an apparatus having the smaller executed count of times, that is, an apparatus that is less frequently used at the operation-support requested time is used by the user who is unfamiliar with the apparatus, and ranks the apparatus as highly likely to be an apparatus to be supported.

The to-be-supported apparatus estimating unit 107 may rank the apparatuses using one of the three methods, or using the plural methods associated with each other. As the specific example of associating the plural methods with each other, when there are plural apparatuses having smaller time differences (time differences having predetermined lengths or shorter) as a result of ranking the apparatuses using the time information, the to-be-supported apparatus estimating unit 107 may rank the apparatuses having the smaller time differences using the interface information, or use status information.

The estimation and ranking of the apparatuses to be supported in Steps S1304 to 1306 of FIG. 13 will be further described in detail with reference to FIG. 16.

Figure 16:
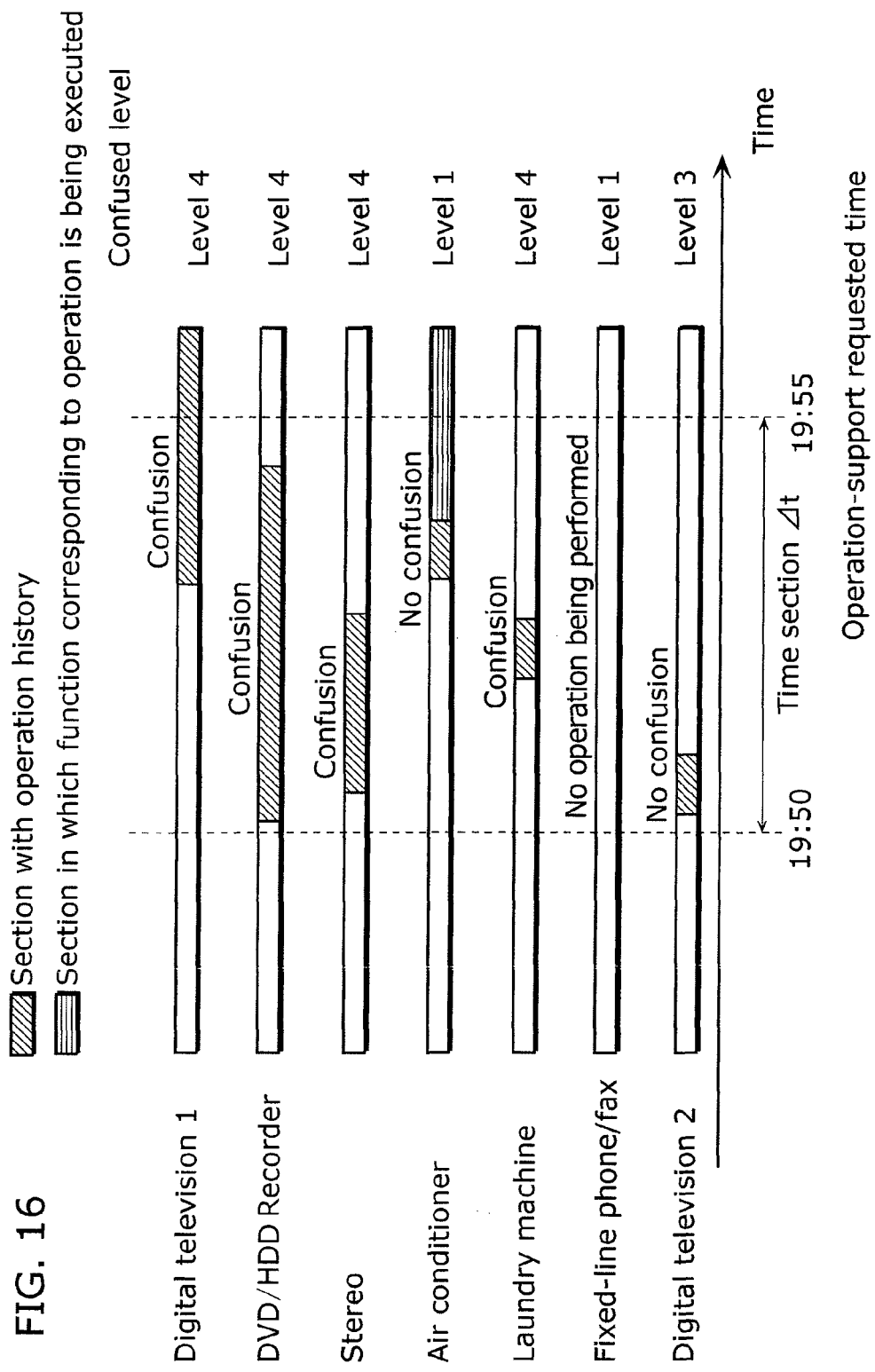
FIG. 16 illustrates the operation history information and confusion determination results held by an apparatus connected, via the network, to the operation supporting terminal according to the embodiment of the present invention.

FIG. 16 illustrates the operation history information and confusion determination results held by an apparatus connected to the operation supporting terminal 101 according to the embodiment of the present invention via the network 200.

As illustrated in FIG. 16, the user requested support for operation at 19:55. Assuming that 5 minutes is set as a time period preceding from the time when the support was requested, the time section Δt is from 19:50 to 19:55. Thus, as a result of collection of the operation histories in the time section Δt by the operation history collecting unit 103 included in the operation supporting terminal 101, sections in each of which an input operation is received are represented by shaded areas in bar charts. Furthermore, the results of the confusion determining process in Step S1501 of FIG. 15 performed based on the collected operation histories by the to-be-supported apparatus estimating unit 107 are shown above the shaded areas in each of the bar charts. Furthermore, horizontal lines in the bar charts show a section in which a function is being executed by the apparatus determined by the operation history collecting unit 103 as executing the function corresponding to the operations as a result of the processing in Step S1502 of FIG. 15. Although the operation history collecting unit 103 does not collect operation histories after the operation-support requested time in the description of FIG. 16, it may collect operation histories several minutes after the operation-support requested time as previously described.

Since a digital television 1 has a history of an input operation and is determined that confusion is present, it is in the confused level 4. Similarly, the DVD/HDD recorder, stereo, and laundry machine are also in the confused level 4. Since the air conditioner has a history of an input operation but the operation ends in a state where a function is being executed, it is in the confused level 1. Since the fixed-line phone/fax has no history of an input operation in the time section Δt and neither a function is being executed nor the user is performing the operation, it is in the confused level 1. Since a digital television 2 has a history of an input operation, is determined that confusion is not present, and is not executing a function corresponding to the operation, it is in the confused level 3.

As a result of the determination of a confused level for each apparatus, there are the apparatuses having the same confused level. Thus, the to-be-supported apparatus estimating unit 107 ranks the apparatuses having the same confused level using the time information and the interface information as previously described.

First, ranking the digital television 1, the DVD/HDD recorder, the stereo, and the laundry machine that are apparatuses of the confused level 4 will be described. Since the digital television 1 had an input operation at the operation-support requested time, it is ranked as being the least confused apparatus. Next, the DVD/HDD recorder that is an apparatus having the smallest time difference between the operation-support requested time and the last input operation time is ranked as being the most confused apparatus among the apparatuses of the confused level 4. Since the remaining stereo and the laundry machine have no time difference between the operation-support requested time and the last input operation time, they are ranked using the interface information. Since the function count 602 and the button count/hierarchy level count 606 in FIG. 6 show that the count of buttons of the stereo is larger than that of the laundry machine and the count of functions of the stereo is smaller than that of the laundry machine, the to-be-supported apparatus estimating unit 107 ranks that the user is more confused about the stereo than the laundry machine. In this manner, the to-be-supported apparatus estimating unit 107 determines ranks (ranks in order of higher probability of being confused) of the apparatuses of the confused level 4. In other words, the to-be-supported apparatus estimating unit 107 determines the ranks of the apparatuses such that the DVD/HDD recorder is the highest, and then, the stereo, the laundry machine, and the digital television 1 follow in order.

The to-be-supported apparatus estimating unit 107 determines both of the air conditioner and the fixed-line phone/fax that are the apparatuses of the confused level 1 are ranked first because they are the apparatuses each having a low requirement for support in operation. In other words, the to-be-supported apparatus estimating unit 107 does not rank the apparatuses of the confused level 1.

The results determined herein correspond to the estimated-apparatus result information 110a in FIG. 10.

Next, the processing in which the supporting method determining unit 111 determines a supporting method and the function description output unit 112 outputs function description information, in other words, a specific example of the processes of Step S1310 and Step S1311 in FIG. 13 will be hereinafter described.

FIG. 17 illustrates an example of an output screen to which the function description output unit 112 included in the operation supporting terminal 101 according to the embodiment of the present invention outputs descriptions. As illustrated in (a) of FIG. 17, the function description output unit 112 presents apparatuses to be supported which are estimated by the to-be-supported apparatus estimating unit 107, in descending order of the confused levels. Furthermore, the function description output unit 112 presents apparatuses having the same confused level in descending order of the within-level ranks. Upon selection of an apparatus desired by the user to be supported, the function description output unit 112 presents the functions of the selected apparatus as illustrated in (b) of FIG. 17 in descending order of the estimated scores of the functions that are estimated by the to-be-supported function estimating unit 109. Upon further selection of a function desired by the user to be supported from a screen illustrated in (b) of FIG. 17, the function description output unit 112 presents function descriptions or operation descriptions of the selected function as illustrated in (c) of FIG. 17. Furthermore, upon selection of a function from the screen of (c) in FIG. 17, a screen as illustrated in (d) of FIG. 17 is displayed.

FIG. 18 shows an example of an output screen showing a status in which a user different from the user whose operation has been supported by the operation supporting terminal 101 according to the embodiment of the present invention is confused. As illustrated in FIG. 18, an icon of an apparatus about which another user is confused is displayed so that the status in which the other user is confused is notified to the user who requests support in operation.

FIG. 19 shows an example of an output screen on which apparatuses and functions estimated by the operation supporting terminal 101 according to the embodiment of the present invention are simultaneously displayed. In other words, the screen in FIG. 19 is an example of a screen to be outputted when the supporting method determining unit 111 determines an output of a screen per function. The supporting method determining unit 111 determines whether a description is outputted per function or per apparatus based on a count of items displayable on a screen, distribution of the confused levels of each apparatus, and the scores of the estimated functions. For example, when an apparatus estimated that is highly likely to have a high requirement for support in operation has an estimated function with a score higher than a predetermined value, the supporting method determining unit 111 determines the output per function. As a result, since the function description output unit 112 outputs a description per function as illustrated in FIG. 19, the user can directly select a function without selecting an apparatus. In other words, the user can be supported in operation with less operation of the operation supporting terminal 101. As illustrated in FIG. 19, even when the supporting method determining unit 111 determines an output of a description per function, preferably, the function description output unit 112 outputs a description of information for identifying an apparatus (for example, icons each showing an illustration of an apparatus in FIG. 19) as well as the function to a screen. The display prevents the user from being unable to understand which apparatus has the outputted function.

FIG. 20 shows an example of an output screen when the operation supporting terminal 101 according to the embodiment of the present invention controls a method for displaying estimated functions according to a count of items displayable per screen. The screen in FIG. 20 is different from the screen in FIG. 19 in that a count of functions displayed per screen varies for each apparatus. This is because the supporting method determining unit 111 determines a count of functions displayed per apparatus based on a count of items displayable on a screen, the distribution of the confused levels of each apparatus, and the scores of the estimated functions. Here, the count of items is an example of an amount of information that can be outputted by the function description output unit 112. For example, assume that the count of items displayable on a screen is 4, and 3 apparatuses are in the confused level 4 and the remaining apparatuses are in the confused levels 1 to 3. Here, the supporting method determining unit 111 determines to output 2 estimated functions of apparatuses ranked as being the most confused among the apparatuses in the confused level 4. In other words, the supporting method determining unit 111 determines to output only functions corresponding to apparatuses in the confused level 4 on the first page of a screen. As a result, since the function description output unit 112 can output functions of the apparatuses in the higher confused level, it is highly likely that the user can select a function for which the user needs the operation support, directly from a screen. In other words, the user can be supported in operation with less operation of the operation supporting terminal 101.

The method for outputting a description to a screen per function is not limited to the methods illustrated in FIGS. 19 and 20. For example, the supporting method determining unit 111 may determine to output, in the first page of a screen, only estimated functions of apparatuses ranked as being the most confused among the apparatuses in the confused level 4. Furthermore, the supporting method determining unit 111 may hold a threshold of a score of an estimated function for each confused level, and determine to output functions each having a score exceeding the threshold in order.

Although the operation supporting terminal according an aspect of the present invention is described based on the embodiment, the present invention is not limited to the embodiment.

For example, although information of each apparatus is collected from the apparatus information storage unit 1004 stored in each apparatus in the embodiment, it may be collected from a centralized server as necessary. Furthermore, the apparatus information may be stored in the operation supporting terminal 101 in advance.

Furthermore, although the operation supporting terminal 101 is assumed to support an operation for the user, a device that supports the operation is not limited to the operation supporting terminal 101. For example, the device may be connected to a network including the constituent elements for supporting the operation.

Furthermore, although the operation supporting terminal 101 stores a table as the function-estimating definition information as illustrated in FIG. 9, and estimates a target function through comparison between an input operation and an operation pattern defined in the table, a method for estimating the target function using information of an input operation is not limited to such. For example, the operation supporting terminal 101 may estimate a target function using a method disclosed in Japanese Unexamined Patent Application Publication No. 2007-316803 (Patent Reference 2). More specifically, the operation supporting terminal 101 extracts words included in a menu item selected by the user or words shown in a button selected by the user, from the operation histories. Then, the operation supporting terminal 101 calculates a semantic similarity between the extracted words and the words used in each function description. Finally, the operation supporting terminal 101 determines a function having the higher semantic similarity calculated as a target function.

Since the operation supporting terminal 101 according to an aspect of the present invention identifies an apparatus to be supported using the operation histories, an apparatus to be supported can be estimated without providing a dedicated information providing medium, such as a wireless tag, for the apparatus to be supported. Furthermore, since there is no limitation on a position of the apparatus to be supported, an apparatus having a display may function as the operation supporting terminal 101. Thereby, a dedicated terminal is not necessarily prepared for supporting an operation for an apparatus as described above, and the apparatus having a display may support the operation. For example, the digital television 2001 may estimate a target function according to the embodiment, and may support the operation using a display of the digital television 2001.

INDUSTRIAL APPLICABILITY

Since the present invention can be used for general apparatuses including various household apparatuses, mobile phones, and car navigation systems, as an operation supporting terminal of each of the apparatuses, the potential to be applied is very high.

The invention claimed is:

1. An operation supporting device that provides a user with information on an operation for executing a function desired by the user from among functions of each apparatus of a plurality of apparatuses connected to a network, said operation supporting device comprising:

an operation history collecting unit configured to collect, from each apparatus of the plurality of apparatuses, operation history information including operation histories describing time-series information of operations performed by the user during a time period preceding a predetermined time period from a time when the user requests support;

an apparatus information storage unit configured to store function description information including descriptions of the functions of each apparatus of the plurality of apparatuses;

a confusion definition information storage unit configured to store confusion definition information defining, as confused operations, operations performed when the user is confused due to an inability to execute the function desired by the user;

a to-be-supported apparatus estimating unit configured to determine, for each apparatus of the plurality of apparatuses and with reference to the confusion definition information stored in said confusion definition information storage unit, a respective degree of matching between (i) an operation history of the operation histories included in the operation history information collected by said operation history collecting unit and (ii) a confused operation of the confused operations defined in the confusion definition information, and configured to estimate that an apparatus of the plurality of apparatuses, which is determined to have the respective degree of matching exceeding a predetermined threshold, is an apparatus having a high requirement for support in order for the user to perform the operations; and a function description output unit configured to output at least one description of the descriptions of the functions of the apparatus estimated as having the high requirement for the support, with reference to the function description information stored by said apparatus information storage unit.

2. The operation supporting device according to claim 1, wherein the operation history information further includes execution statuses of each function of the functions of each apparatus of the plurality of apparatuses at the time period preceding the predetermined time period, and wherein said to-be-supported apparatus estimating unit is further configured to determine whether or not a function, of one apparatus of the plurality of apparatuses of which operation histories are not included in the operation history information, is being executed at the time when the user requests the support, based on the execution statuses of each function of the functions included in the operation history information, and configured to estimate that the one apparatus of the plurality of apparatuses is an apparatus having a higher requirement for the support when the function of the one apparatus is determined as not being executed.

3. The operation supporting device according to claim 1, wherein the operation history information further includes execution statuses of each function of the functions of each apparatus of the plurality of apparatuses at the time period preceding the predetermined time period, and wherein said to-be-supported apparatus estimating unit is further configured to determine whether or not one apparatus of the plurality of apparatuses of which operation histories are not included in the operation history information is being operated at the time when the user requests the support, based on the execution statuses of each function of the functions included in the operation history information, and configured to estimate that the one apparatus of the plurality of apparatuses is an apparatus having a higher requirement for the support when the one apparatus of the plurality of apparatuses is determined as being operated.

4. The operation supporting device according to claim 1, wherein said to-be-supported apparatus estimating unit is further configured to:

specify a time when the user last operated each of apparatuses estimated as having the high requirement for the support, with reference to the operation history information, and estimate that, from among the apparatuses having thigh requirement for the support, an apparatus corresponding to a shorter time period from the specified time to the time when the user requests the support is an apparatus having a higher requirement for the support.

5. The operation supporting device according to claim 1, wherein said operation history collecting unit is further configured to collect a count of times the functions have been executed per day of week or per time period from the plurality of apparatuses as usage information, and wherein, when the operation history information does not include operation histories of an apparatus or when there are apparatuses, of the plurality of apparatuses, each estimated as having the high requirement for the support, said to-be-supported apparatus estimating unit is further configured to specify a count of times the functions have been executed by each apparatus of the plurality of apparatuses, during a time period including the time when the user requests the support with reference to the usage information, and configured to estimate that an apparatus, of the plurality of apparatuses, having a smaller count of the times specified is an apparatus having a higher requirement for the support.

6. The operation supporting device according to claim 1, wherein said apparatus information storage unit is further configured to store interface information including information related to a complexity of a user interface of each apparatus of the plurality of apparatuses, and wherein, based on the information related to the complexity of the user interface, said to-be-supported apparatus estimating unit is further configured to estimate that an apparatus, of the plurality of apparatuses, having a more complex user interface is an apparatus having a higher requirement for the support, when the operation history information does not include operation histories of the apparatus or when there are apparatuses, of the plurality of apparatuses, estimated as having the high requirement for the support.

7. The operation supporting device according to claim 1, further comprising:

a function-estimating definition information storage unit configured to store function-estimating definition information defining associations between the time-series information of the operations performed by the user and a target function;

a to-be-supported function estimating unit configured to estimate a function that the user desires to execute and that is included in a corresponding one apparatus of the plurality of apparatuses estimated as having the high requirement for the support, based on the operation history information and the function-estimating definition information; and a supporting method determining unit configured to determine a supporting method based on the function estimated by said to-be-supported function estimating unit, wherein said function description output unit is configured to output a corresponding one description of the descriptions of the functions, according to the supporting method determined by said supporting method determining unit.

8. The operation supporting device according to claim 7, wherein the time-series information of the operations performed by the user and the target function are associated with each other in the function-estimating definition information, and the function-estimating definition information further includes a target probability indicating a probability of being the function desired by the user, wherein said to-be-supported function estimating unit is configured to estimate that a target function having a higher target probability is a function having a higher requirement for the support, from among target functions in which the time-series information and the operation histories included in the operation history information match, the time-series information being of the operations performed by the user and being included in the function-estimating definition information, and wherein said supporting method determining unit is configured to determine the supporting method indicating whether said function description output unit outputs each description of the descriptions of the functions per apparatus or per function, based on (i) a level of a requirement for the support to operate the function estimated by said to-be-supported function estimating unit and (ii) an amount of information that can be outputted by said function description output unit.

9. The operation supporting device according to claim 1, wherein said to-be-supported apparatus estimating unit is further configured to extract, from among the plurality of apparatuses, each of apparatuses which receives an input operation at the time when the user requests the support, with reference to the operation history information, and wherein said function description output unit is configured to output the at least one description of the descriptions, so that the user can identify the apparatus estimated by said to-be-supported apparatus estimating unit as having the high requirement for the support, from among the apparatuses extracted by said to-be-supported apparatus estimating unit.

10. The operation supporting device according to claim 1, wherein the confusion definition information is information in which an operation pattern of an operation button to be operated by the confused user and the predetermined threshold are associated with each other, and wherein said to-be-supported apparatus estimating unit is configured to determine, for each apparatus of the plurality of apparatuses, a respective degree of matching between (i) the operation history of the operation histories included in the operation history information and (ii) the operation pattern included in the confusion definition information, and configured to estimate that an apparatus of the plurality of apparatuses, which is determined to have the respective degree of matching exceeding a predetermined threshold corresponding to the operation pattern, is an apparatus having a higher requirement for the support.

11. An operation supporting method in which an operation supporting device provides a user with information on an operation for executing a function desired by the user from among functions of each apparatus of a plurality of apparatuses connected to a network, wherein the operation supporting device includes:
an apparatus information storage unit configured to store function description information including descriptions of the functions of each apparatus of the plurality of apparatuses; and
a confusion definition information storage unit configured to store confusion definition information defining, as confused operations, operations performed when the user is confused due to an inability to execute the function desired by the user, and wherein said operation supporting method comprises:
collecting, from each apparatus of the plurality of apparatuses, operation history information including operation histories describing time-series information of operations performed by the user during a time period preceding a predetermined time period from a time when the user requests support, said collecting of the operation history information being performed by the operation supporting device;
determining, for each apparatus of the plurality of apparatuses and with reference to the confusion definition information stored in the confusion definition information storage unit, a respective degree of matching between (i) an operation history of the operation histories included in the operation history information collected in said collecting of the operation history information and (ii) a confused operation of the confused operations defined in the confusion definition information, and estimating that an apparatus of the plurality of apparatuses, which is determined to have the respective degree of matching exceeding a predetermined threshold, is an apparatus having a high requirement for support in order for the user to perform the operations, said determining and said estimating being performed by the operation supporting device; and outputting at least one description of the descriptions of the functions of the apparatus estimated as having the high requirement for the support, with reference to the function description information stored by the apparatus information storage unit, said outputting being performed by the operation supporting device.

12. A non-transitory computer-readable recording medium having a program recorded thereon, the program being executable on a computer for providing a user with information on an operation for executing a function desired by the user from among functions of each apparatus of a plurality of apparatuses connected to a network, wherein the computer includes:
an apparatus information storage unit configured to store function description information including descriptions of the functions of each apparatus of the plurality of apparatuses; and
a confusion definition information storage unit configured to store confusion definition information defining, as confused operations, operations performed when the user is confused due to an inability to execute the function desired by the user, and wherein the program causes the computer to execute a method comprising:
collecting, from each apparatus of the plurality of apparatuses, operation history information including operation histories describing time-series information of operations performed by the user during a time period preceding a predetermined time period from a time when the user requests support;
determining, for each apparatus of the plurality of apparatuses and with reference to the confusion definition information stored in the confusion definition information storage unit, a respective degree of matching between (i) an operation history of the operation histories included in the operation history information collected in the collecting of the operation history information and (ii) a confused operation of the confused operations defined in the confusion definition information, and estimating that an apparatus of the plurality of apparatuses, which is determined to have the respective degree of matching exceeding a predetermined threshold, is an apparatus having a high requirement for support in order for the user to perform the operations; and
outputting at least one description of the descriptions of the functions of the apparatus estimated as having the high requirement for the support, with reference to the function description information stored by the apparatus information storage unit.

13. An operation-supported-apparatus estimating device that estimates an apparatus having a high requirement for support in order for a user to perform an operation from among a plurality of apparatuses connected to a network, said operation-supported-apparatus estimating device comprising:
an operation history collecting unit configured to collect, from each apparatus of the plurality of apparatuses, operation history information including operation histories describing time-series information of operations performed by the user during a time period preceding a predetermined time period from a time when the user requests support; and a to-be-supported apparatus estimating unit configured to determine, for each apparatus of the plurality of apparatuses and with reference to confusion definition information stored in a confusion definition information storage unit and defining, as confused operations, operations performed when the user is confused due to an inability to execute a function desired by the user, a respective degree of matching between (i) an operation history of the operation histories included in the operation history information collected by said operation history collecting unit and (ii) a confused operation of the confused operations defined in the confusion definition information; and estimate that an apparatus of the plurality of apparatuses, which is determined to have the respective degree of matching exceeding a predetermined threshold, is the apparatus having the high requirement for support in order for the user to perform the operation.

* * * * *